(12) United States Patent
Omoto et al.

(10) Patent No.: US 7,387,650 B2
(45) Date of Patent: Jun. 17, 2008

(54) FUEL CELL POWER GENERATION SYSTEM AND METHOD FOR OPERATING THE SAME

(75) Inventors: Setsuo Omoto, Hiroshima (JP); Naohiko Ishibashi, Hiroshima (JP); Keiji Fujikawa, Hiroshima (JP); Hirohisa Yoshida, Hiroshima (JP); Masami Kondo, Hiroshima (JP); Shigeru Nojima, Hiroshima (JP); Toshinobu Yasutake, Hiroshima (JP); Satoru Watanabe, Hiroshima (JP); Masanao Yonemura, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 57 days.

(21) Appl. No.: 10/509,741

(22) PCT Filed: Apr. 25, 2003

(86) PCT No.: PCT/JP03/05353

§ 371 (c)(1),
(2), (4) Date: Sep. 30, 2004

(87) PCT Pub. No.: WO03/094273

PCT Pub. Date: Nov. 13, 2003

(65) Prior Publication Data

US 2005/0112423 A1 May 26, 2005

(30) Foreign Application Priority Data

May 2, 2002 (JP) .............................. 2002-130315
Jul. 8, 2002 (JP) .............................. 2002-198615

(51) Int. Cl.
*B01J 8/00* (2006.01)

(52) U.S. Cl. ..................... 48/61; 48/127.9; 48/128; 48/75; 48/63; 48/85; 48/93; 48/197 R; 423/230; 423/219; 423/212; 423/213.2; 423/217; 210/95; 95/21; 95/263; 502/53

(58) Field of Classification Search ................. 422/187, 422/129; 48/61; 95/138, 148; 423/213.2, 423/219, 212
See application file for complete search history.

(56) References Cited

U.S. PATENT DOCUMENTS 3,944,650 A * 3/1976 Hirota et al. .......... 423/243.08

(Continued)

FOREIGN PATENT DOCUMENTS

EP 0550892 A1 7/1993

(Continued)

*Primary Examiner*—Alexa A. Neckel
*Assistant Examiner*—Kaity Handal
(74) *Attorney, Agent, or Firm*—Wenderoth, Lind & Ponack, L.L.P.

(57) ABSTRACT

A fuel cell power generation system, equipped with a fuel reforming device and a fuel cell body, includes valves, pipelines, a condenser, and a pump for feeding a burner exhaust gas (raw gas) discharged from a heating burner of the fuel reforming device into the fuel reforming device, and an inert gas formation device including an oxidizable and reducible oxygen adsorbent, which is disposed in the pipelines, and adsorbs oxygen in the burner exhaust gas to remove oxygen from the burner exhaust gas and form an inert gas. The fuel cell power generation system can reliably remove residual matter, without leaving it within the fuel reforming device, in a simple manner at a low cost and with a compact configuration.

9 Claims, 8 Drawing Sheets

U.S. PATENT DOCUMENTS

| | | | |
|---|---|---|---|
| 4,287,170 A * | 9/1981 | Erickson | 423/219 |
| 5,248,567 A * | 9/1993 | Amemiya et al. | |
| 6,153,163 A | 11/2000 | Prasad et al. | 423/246 |
| 2002/0024038 A1* | 2/2002 | Iijima et al. | 252/373 |
| 2002/0110712 A1* | 8/2002 | Struthers et al. | 429/19 |
| 2003/0205458 A1* | 11/2003 | Roychowdhury | 204/170 |

FOREIGN PATENT DOCUMENTS

| | | |
|---|---|---|
| JP | 60-112263 | 6/1985 |
| JP | 61-24155 | 2/1986 |
| JP | 5-205759 | 8/1993 |
| JP | 5-217593 | 8/1993 |
| JP | 6-203865 | 7/1994 |
| JP | 7-169493 | 7/1995 |
| JP | 8-243386 | 9/1996 |
| JP | 9-330731 | 12/1997 |
| JP | 11-26004 | 1/1999 |
| JP | 11-191426 | 7/1999 |
| JP | 2000-277137 | 10/2000 |
| JP | 2000-277138 | 10/2000 |
| JP | 2001-180908 | 7/2001 |
| JP | 2002-20102 | 1/2002 |
| JP | 2002-34102 | 1/2002 |
| JP | 2002-110207 | 4/2002 |
| JP | 2002-280038 | 9/2002 |

* cited by examiner

Example of Testing Device

FUEL CELL POWER GENERATION SYSTEM AND METHOD FOR OPERATING THE SAME

TECHNICAL FIELD

This invention relates to a fuel cell power generation system and a method for operating it. More particularly, the invention relates to a technology which can reliably remove residual matter, such as a combustible gas or moisture, oxygen, etc., without leaving them within a fuel reforming device, at a low cost and with a compact configuration.

BACKGROUND ART

A fuel cell power generation system is mainly composed of a fuel reforming device and a fuel cell body, and has attracted attention as a dispersed type power source for households, etc. The fuel reforming device converts a fuel gas, such as city gas, into a hydrogen-rich reformed gas, and supplies it to the fuel cell body. The fuel cell body reacts the reformed gas with air electrochemically to generate electrical power.

In such a fuel cell power generation system, if operation is stopped instantaneously, a combustible gas, such as hydrogen or methane, moisture, and so on remains in different parts of the fuel reforming device or the like. During maintenance and inspection, the combustible gas may leak to the outside, or moisture may form dew on a catalyst, deteriorating the catalyst.

Thus, Japanese Patent Application Laid-Open No. 2001-277137, for example, proposes to feed air into the fuel reforming device at the time of stopping power generation to fill the fuel reforming device with air, thereby removing residual matter, such as a combustible gas or moisture, from the interior of the fuel reforming device. However, oxygen in the air is likely to deteriorate the catalyst of the fuel reforming device (especially, a Cu/Zn-based LTS catalyst used in a CO conversion reaction).

Hence, Japanese Patent Application Laid-Open No. 2001-180908, for example, proposes that a precious metal catalyst minimally deteriorated by oxygen be applied to the fuel reforming device. However, the precious metal catalyst is lower in catalytic efficiency than the Cu/Zn-based catalyst (about 1/5 to 1/10 expressed as volume ratio), thus resulting in the upsizing of the fuel reforming device, and posing difficulty in heating the entire device uniformly.

In the light of these disadvantages, Japanese Patent Application Laid-Open No. 2000-277137, for example, proposes performing a combustion reaction between a fuel gas or a reformed gas and air to produce an inert gas mainly consisting of nitrogen and carbon dioxide; storing the inert gas in a tank for a while; and withdrawing the inert gas from the tank when stopping operation to fill the inert gas into the fuel reforming device, thereby removing residual matter, such as a combustible gas or moisture, from within the fuel reforming device.

Moreover, Japanese Patent Application Laid-Open No. 2000-277138, for example, shows a system newly provided with a second fuel cell body different from the fuel cell body for power generation, and proposes performing an electrochemical reaction between a reformed gas and air, or air discharged from the fuel cell body for power generation, in the second fuel cell body to discharge low-oxygen, nitrogen-rich exhaust air from the second fuel cell body, so as to utilize it as an inert gas; and, when stopping operation, filling the inert gas into the fuel reforming device, thereby removing residual matter, such as a combustible gas or moisture, from within the fuel reforming device.

With the aforementioned means proposed in the above-described Japanese Patent Application Laid-Open No. 2000-277137, however, unless the fuel gas or reformed gas and air are subjected to the combustion reaction stoichiometrically equally, oxygen or the combustible gas remains in the inert gas. This makes it actually difficult to produce the inert gas. Also, the tank for storage of the inert gas has to be rendered ready for use, causing the upsizing and cost increase of the system.

These are marked disadvantages to the utilization of the system as a dispersed type power source for households.

With the aforementioned means proposed in the above-described Japanese Patent Application Laid-Open No. 2000-277138, on the other hand, air discharged as a result of the electrochemical reaction between the reformed gas and air, or air discharged from the fuel cell body for power generation, performed in the second fuel cell body is utilized as the inert gas. Thus, oxygen is not entirely consumed in the second fuel cell body, but remains in the inert gas. This makes it actually difficult to produce a complete inert gas. Also, the fuel cell body for production of the inert gas has to be rendered ready for use, thereby causing the upsizing and cost increase of the system. These are marked disadvantages to the utilization of the system as a dispersed type power source for households.

Under these circumstances, it is the object of the present invention to provide a technology which can reliably remove residual matter, such as a combustible gas or moisture, and oxygen, without leaving them within a fuel reforming device of a fuel cell power generation system, at a low cost and with a compact configuration.

SUMMARY OF THE INVENTION

A fuel cell power generation system according to the first invention, for solving the above-described challenge, is a fuel cell power generation system equipped with a fuel reforming device and a fuel cell body, the fuel cell power generation system being characterized by raw gas feeding means for feeding into the fuel reforming device at least one raw gas among a burner exhaust gas discharged from a heating burner of the fuel reforming device, exhaust air discharged from a cathode of the fuel cell body, and air from outside the system; and inert gas formation means including an oxidizable and reducible oxygen adsorbent which adsorbs oxygen in the raw gas to remove oxygen from the raw gas and generate an inert gas.

A fuel cell power generation system according to the second invention is that of the first invention, characterized by adsorbent reduction means for reducing the oxygen adsorbent which has adsorbed oxygen.

A fuel cell power generation system according to the third invention is that of the first or second invention, characterized in that the oxygen adsorbent is disposed in at least one location among a location in the raw gas feeding means, a location between a reforming catalyst layer and a CO conversion catalyst layer provided in the fuel reforming device, a location upstream of the reforming catalyst layer within the fuel reforming device, and a location in the reforming catalyst layer provided in the fuel reforming device.

A fuel cell power generation system according to the fourth invention is that of any one of the first to third inventions, characterized in that the oxygen adsorbent comprises at least one of chromium (Cr), manganese (Mn), iron (Fe), cobalt (Co), nickel (Ni), copper (Cu), and zinc (Zn).

A fuel cell power generation system according to the fifth invention is a fuel cell power generation system equipped with a fuel reforming device and a fuel cell body, the fuel cell power generation system being characterized by raw gas feeding means for feeding into the fuel reforming device at least one raw gas among a burner exhaust gas discharged from a heating burner of the fuel reforming device, exhaust air discharged from a cathode of the fuel cell body, and air from outside the system; and inert gas formation means including an oxygen absorbing solution which absorbs oxygen in the raw gas to remove oxygen from the raw gas and generate an inert gas.

A fuel cell power generation system according to the sixth invention is that of the fifth invention, characterized in that the oxygen absorbing solution is an $Na_2SO_3$ solution.

A fuel cell power generation system according to the seventh invention is a fuel cell power generation system equipped with a fuel reforming device and a fuel cell body, the fuel cell power generation system being characterized by inert gas formation means comprising: carbon dioxide recovery means including an aqueous amine solution which is fed with at least one raw gas among an anode exhaust gas discharged from an anode of the fuel cell body, and a reformed gas formed by reforming in the fuel reforming device, to absorb carbon dioxide in the raw gas; and carbon dioxide feeding means adapted to heat the aqueous amine solution of the carbon dioxide recovery means, thereby releasing carbon dioxide from the aqueous amine solution, and feed the carbon dioxide into the fuel reforming device.

A fuel cell power generation system according to the eighth invention is that of the seventh invention, characterized by raw gas recycling means for supplying the raw gas, from which carbon dioxide has been recovered by the carbon dioxide recovery means, to the burner of the fuel reforming device.

A fuel cell power generation system according to the ninth invention is that of the seventh or eighth invention, characterized by moisture recovery means for recovering moisture from the carbon dioxide fed into the fuel reforming device, and moisture recycling means for returning the moisture, which has been recovered by the moisture recovery means, to the aqueous amine solution of the carbon dioxide recovery means.

A method for operating a fuel cell power generation system according to the tenth invention is a method for operating the fuel cell power generation system according to any one of the first to fourth inventions, characterized by forming the inert gas by the inert gas formation means, and removing residual matter, which has remained within the fuel reforming device, with the inert gas for inert gas purging, in stopping an operation for power generation.

A method for operating a fuel cell power generation system according to the eleventh invention is that of the tenth invention, characterized by reducing the oxygen adsorbent of the inert gas formation means with a reformed gas formed by reforming in the fuel reforming device, or an anode exhaust gas discharged from an anode of the fuel cell body, thereby performing regeneration of the oxygen adsorbent of the inert gas formation means.

A method for operating a fuel cell power generation system according to the twelfth invention is that of the eleventh invention, characterized by performing the regeneration in carrying out an operation for power generation.

A method for operating a fuel cell power generation system according to the thirteenth invention is a method for operating the fuel cell power generation system of the fifth or sixth invention, characterized by forming the inert gas by the inert gas formation means, and removing residual matter, which has remained within the fuel reforming device, with the inert gas for inert gas purging, in stopping an operation for power generation.

A method for operating a fuel cell power generation system according to the fourteenth invention is a method for operating the fuel cell power generation system of any one of the seventh to ninth inventions, characterized by recovering carbon dioxide in the raw gas by the carbon dioxide recovery means of the inert gas formation means during an operation for power generation, and actuating the carbon dioxide feeding means of the inert gas formation means to form an inert gas from the aqueous amine solution, thereby removing residual matter, which has remained within the fuel reforming device, for inert gas purging, in stopping the operation for power generation.

A method for operating a fuel cell power generation system according to the fifteenth invention is that of the fourteenth invention, characterized by supplying the raw gas, from which carbon dioxide has been recovered by the carbon dioxide recovery means, to the burner of the fuel reforming device during the operation for power generation.

A method for operating a fuel cell power generation system according to the sixteenth invention is that of the fourteenth or fifteenth invention, characterized by recovering moisture from the carbon dioxide, which is fed into the fuel reforming device by the carbon dioxide feeding means, and returning the moisture to the aqueous amine solution of the carbon dioxide recovery means by the carbon dioxide feeding means, in stopping the operation for power generation.

A method for operating a fuel cell power generation system according to the seventeenth invention is that of any one of the tenth to sixteenth inventions, characterized by removing the residual matter within the fuel reforming device with steam before purging the interior of the fuel reforming device with the inert gas.

A method for operating a fuel cell power generation system according to the eighteenth invention is that of the seventeenth invention, characterized by removing the residual matter within the fuel reforming device with steam, then flowing only air to the burner of the fuel reforming device to cool the fuel reforming device, and then purging the interior of the fuel reforming device with the inert gas.

A method for operating a fuel cell power generation system according to the nineteenth invention is that of the seventeenth or eighteenth invention, characterized in that the steam for removing the residual matter within the fuel reforming device has a fuel gas incorporated therein, the fuel gas being in an amount necessary and sufficient to prevent oxidation within the fuel reforming device.

A method for operating a fuel cell power generation system according to the twentieth invention is that of any one of the tenth to nineteenth inventions, characterized by actuating only the burner of the fuel reforming device to heat and raise the temperature of the fuel reforming device; feeding steam to the fuel reforming device during a rise in the temperature of the fuel reforming device, the steam containing a necessary and sufficient amount of a fuel gas to prevent oxidation within the fuel reforming device; and supplying the fuel gas, in a necessary amount according to the actuation of the fuel cell body, after completion of the rise in the temperature of the fuel reforming device, to start an operation for power generation.

DETAILED DESCRIPTION OF THE INVENTION

Embodiments of a fuel cell power generation system according to the present invention, and a method for operating it, will now be described by reference to the accompanying drawings, but the present invention is in no way limited to these embodiments.

FIRST EMBODIMENT

Use of an Oxygen Adsorbent

Figure 1:
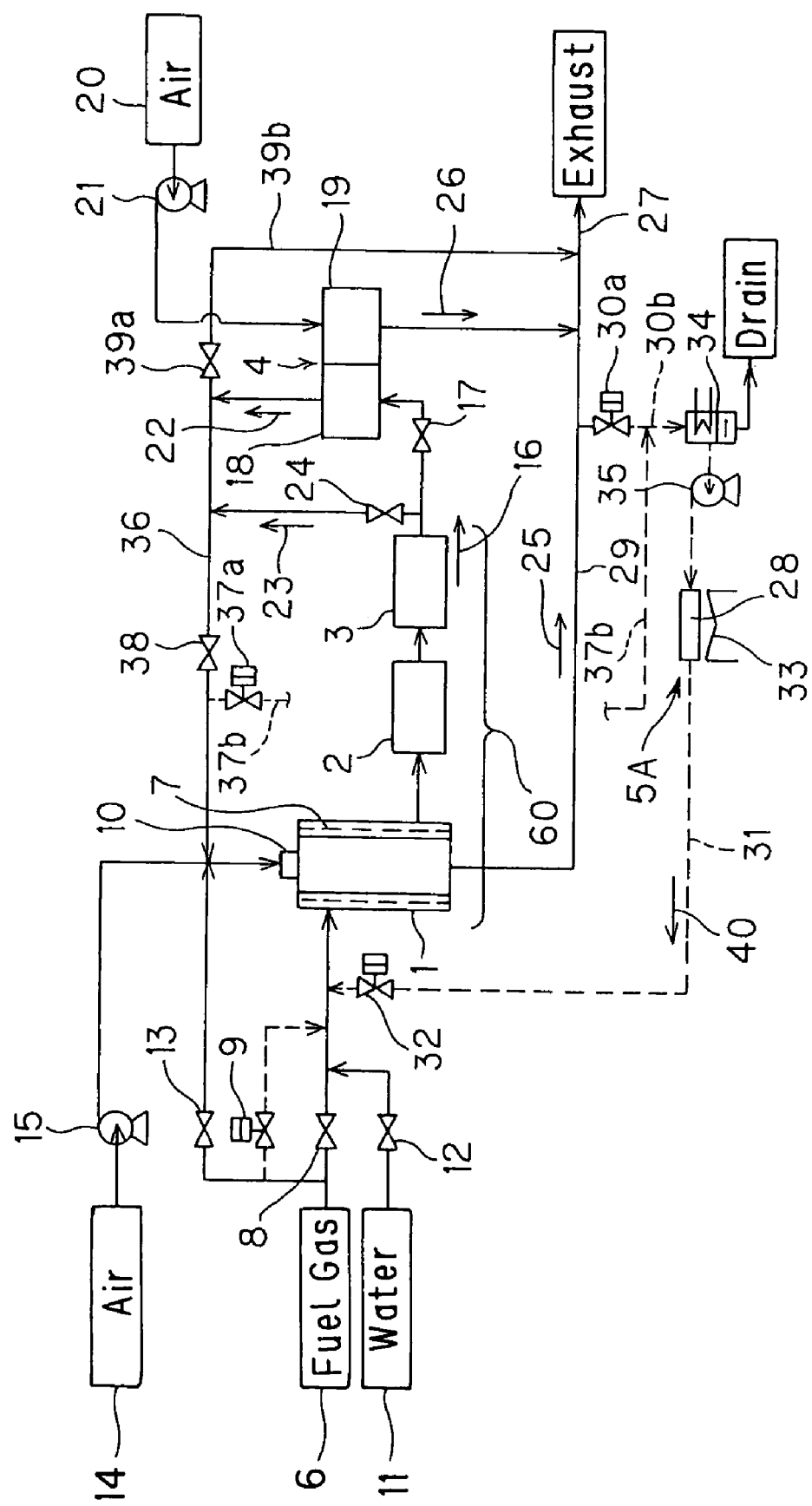
FIG. 1 is a schematic configurational drawing of a first embodiment of a fuel cell power generation system according to the present invention.

A first embodiment of a fuel cell power generation system according to the present invention, and a method for operating it will be described with reference to FIG. 1. FIG. 1 is a schematic configurational drawing of the fuel cell power generation system.

The fuel cell power generation system according to the present embodiment is a fuel cell power generation system equipped with a fuel reforming device 60 and a fuel cell body 4, as shown in FIG. 1. This fuel cell power generation system includes valves 30a, 32, pipelines 30b, 31, a condenser 34, a pump 35, etc. which constitute raw gas feeding means for feeding a burner exhaust gas 25 (raw gas) discharged from a heating burner 10 of the fuel reforming device 60; and an inert gas formation device 5A which is inert gas formation means containing an oxidizable and reducible oxygen adsorbent 28 disposed in the pipelines 30b, 31 to adsorb oxygen in the burner exhaust gas 25, thereby removing oxygen from the burner exhaust gas 25 and forming an inert gas 40.

The fuel cell power generation system according to the present embodiment also includes a heater 33 which is adsorbent reduction means for reducing the oxygen adsorbent 28 having adsorbed oxygen.

The fuel reforming device 60 is equipped with a fuel reformer 1, a CO conversion catalyst reactor 2, and a PROX catalyst reactor 3. The reforming of a fuel gas 6 is performed, mainly, in the fuel reformer 1 by mixing the fuel gas 6 and steam, and flowing the mixture through a reforming catalyst layer 7 to cause a steam reforming reaction ($CH_4 + H_2O \rightarrow CO + 3H_2O$) generally at a temperature of 500 to 700° C. $Ru/Al_2O_3$, for example, can be used as a reforming catalyst. City gas or LPG (liquefied propane gas), DME (dimethylethanol), or kerosene is used as the fuel gas 6.

The fuel gas 6 is supplied to the fuel reformer 1 via a main valve 8 and a sub-valve 9. Since the steam reforming reaction is an endothermic reaction, the fuel reformer 1 is provided with the burner 10 as a heat source. Water 11 is supplied to the fuel reformer 1 via a valve 12. The water 12 is converted into steam by an evaporator (not shown) utilizing the heat of the burner 10. The burner 10 is supplied with part of the fuel gas 6 via a valve 13, and air 14 via a pump 15.

The CO conversion catalyst reactor 2 forms hydrogen from steam and carbon monoxide by a CO conversion (also called CO shift) reaction ($CO + H_2 \rightarrow CO_2 + H_2$) using a CO conversion catalyst layer, and is used to raise the efficiency of reforming by making the effective use of CO which has been formed by the steam reforming reaction in the fuel reformer 1.

Among CO conversion catalysts, there are HTS (high temperature shift catalyst) acting at a relatively high temperature (about 400° C.) and LTS (low temperature shift catalyst) acting at a relatively low temperature (about 200° C.). There are a case where only LTS is used, and a case where both HTS and LTS are used. $Fe_2O_3 \cdot Cr_2O_3$, for example, can be used as the HTS catalyst. $CuO \cdot ZnO$, for example, can be used as the LTS catalyst.

The PROX catalyst reactor 3 performs a PReferable OXidization reaction ($CO + \frac{1}{2}O_2 \rightarrow CO_2$) using a PROX catalyst layer, thereby converting carbon monoxide, which is a toxic substance, into carbon dioxide (carbonic acid gas), and is used to minimize the carbon monoxide concentration of a reformed gas 16. $Ru/Al_2O_3$ can be used as the PROX catalyst. Moreover, the PROX reaction is performed at about 100 to 150° C.

The reformed gas 16, which has been reformed from the fuel gas 6 by passing through the fuel reformer 1, the CO conversion catalyst reactor 2, and the PROX catalyst reactor 3, is supplied to an anode 18 of the fuel cell body 4 via a valve 17. A cathode 19 of the fuel cell body 4 is supplied with air 20 via a pump 21.

An anode exhaust gas (reformed gas after use) 22 discharged from the fuel cell body 4 is returned to the fuel reformer 1 via an anode exhaust gas passage 36 and a valve 38, and is used, for example, as a fuel for the burner 10. An unused reformed gas 23, which has been reformed by the fuel reforming device 60, but becomes a surplus for the convenience of power generation load, is also returned to the fuel reformer 1 via a valve 24, the anode exhaust gas passage 36 and the valve 38, and is used, for example, as a fuel for the burner 10.

The burner exhaust gas 25 discharged from the fuel reformer 1, and cathode exhaust air 26 discharged from the fuel cell body 4 are discharged to a system exhaust gas passage 27.

The inert gas formation device 5A is mainly composed of the oxygen adsorbent 28 capable of undergoing repeated oxidation and reduction. The oxygen adsorbent 28 in the present embodiment is installed outside the fuel reforming device 60 including the fuel reformer 1, the CO conversion catalyst reactor 2, and the PROX catalyst reactor 3. The oxygen adsorbent 28 is charged into a suitable container. The inlet of the container of the oxygen adsorbent 28 is supplied with part or all of the burner exhaust gas 25 via a burner exhaust gas passage 29, the valve 30a, and the pipeline 30b. The outlet of the container of the oxygen adsorbent 28 is connected to the fuel reformer 1 via the pipeline 31 and the valve 32.

The heater 33 using electricity or the like is annexed to the oxygen adsorbent 28. The condenser 34 and the pump 35 are connected sequentially to the pipeline 30b between the valve 30a and the inlet of the container of the oxygen adsorbent 28. A valve 37a and a pipeline 37b, which enable the used reformed gas 22 or the unused reformed gas 23 to be supplied from a portion of the anode exhaust gas passage 36 downstream of the valve 38, are connected to a portion of the pipeline 30b upstream of the condenser 34.

A valve 39a and a pipeline 39b, which discharge the used reformed gas 22 and the unused reformed gas 23 from the upstream side of the valve 38 to the system exhaust gas passage 27, are connected to the anode exhaust gas passage 36.

The oxygen adsorbent 28 may be any one which can undergo oxidation and reduction. For example, any one of Cr (chromium), Mn (manganese), Fe (iron), Co (cobalt), Ni (nickel), Cu (copper), and Zn (zinc) (preferably, metallic copper (Cu)) can be used. Moreover, a combination of two or more of Cr, Mn, Fe, Co, Ni, Cu and Zn mentioned here (for example, a Cu/Zn mixture) can be used.

In addition to Cu or Cu/Zn, a substance similar to the LTS catalyst can be used. The LTS catalyst, such as the Cu/Zn mixture, has its CO conversion function deteriorated upon repeated oxidation and reduction, but its oxidation and reduction function itself does not decline. The oxygen adsorbent 28 is not limited in terms of its shape, but preferably, it is of a pellet shape or a honeycomb shape.

If Cu is used as the oxygen adsorbent 28, oxygen is adsorbed and removed from the burner exhaust gas 25 according to an oxidation reaction represented by $Cu+\frac{1}{2}O_2 \rightarrow CuO$. This deoxidizing treatment is performed at 100° C. or higher, preferably 150° C. to 700° C., more preferably 200° C. to 400° C. By heating the oxygen adsorbent 28 to 100° C. or above, oxygen can be easily removed from the burner exhaust gas 25.

If Cu is used as the oxygen adsorbent 28, CuO is reduced to Cu according to a reduction reaction represented by $CuO+H_2 \text{ atmosphere} \rightarrow Cu$. This reductive regeneration treatment is performed at 100° C. or higher, preferably 150° C. to 700° C., and more preferably 200° C. to 400° C. By heating the oxygen adsorbent 28, which has adsorbed oxygen, to 100° C. or above, the oxygen adsorbent 28 can be easily regenerated.

To actuate the above-described fuel cell power generation system according to the present embodiment (start an operation for power generation), the following procedure is executed:

(1) The fuel reformer 1 is run at idle to be heated and raised in temperature. That is, the valve 13 is opened, and the pump 15 is operated to actuate only the burner 10 of the fuel reformer 1. The main valve 8, the sub-valve 9, the valve 12, the valve 30a, and the valve 32 are closed, and the condenser 34 and the pump 35 are stopped. At this time, the opening or closing of the valve 17, the valve 24, the valve 37a, the valve 38, and the valve 39a, and the actuation of the pump 21 need not be given consideration. In this situation, however, the valves 17, 24, 37a, 38 and 39a are also closed, and the pump 21 is also stopped.

(2) While raising the temperature of the fuel reformer 1, the valve 12 is opened to flow steam into the fuel reformer 1 and promote the temperature rise of the fuel reformer 1. To prevent the interior of the fuel reformer 1 from being oxidized with steam during this action, the sub-valve 9 is opened to incorporate into steam a tiny amount of the fuel gas 6 necessary and enough to prevent the oxidation of the interior of the fuel reformer 1. Also, the valve 17 and the valve 39a are opened to discharge steam from the anode exhaust gas passage 36 to the system exhaust gas passage 27.

(3) When the temperature rise of the fuel reformer is completed, the main valve 8 is opened, and a steady-state operation is performed. In other words, a necessary amount of the fuel gas 6 suited to the power generation action of the fuel cell body 4 is supplied to the fuel reformer 1. On this occasion, the pump 21 is actuated, the valve 38 is opened, and the valve 39a is closed. The valve 24 is opened, as desired, where a surplus of the reformed gas 23 occurs. The sub-valve 9 may be kept open, or closed.

(4) If, at the initial stage of the operation for power generation, the fuel reforming device 60 does not reach a predetermined temperature, and the CO concentration of the reformed gas 16 does not become 10 ppm or less, the reformed gas 16 is bypassed through the anode exhaust gas passage 36 and utilized for combustion by the burner 10.

In stopping the operation of the fuel cell power generation system according to the present embodiment, on the other hand, the following procedure is executed:

(1) Purging of the interior of the system with steam is effected for several minutes. For this purpose, while the burner 10 is kept in action, namely, while the valve 13 is kept open and the pump 15 is being operated, the main valve 8 is closed, the pump 21 is stopped, and only steam is flowed to the fuel reformer 1.

During this process, the valve 38 is closed, and the valve 39a is opened to discharge steam from the anode 18 of the fuel cell body 4 to the system exhaust gas passage 27. By these means, residual matter in the fuel reformer 1, the CO conversion catalyst reactor 2, the PROX catalyst reactor 3, and the fuel cell body 4 is cleaned away with steam. Furthermore, a tiny amount of the fuel gas 6 necessary and enough to prevent the oxidation of the interior of the fuel reforming device 60 is incorporated into steam by opening the sub-valve 9. The valve 24 is preferably closed.

(2). During the purging of the interior of the system with steam, the temperature of the fuel reformer 1 is lowered (for example, down to 500° C.).

(3) When the fuel reformer 1 has cooled, purging with steam is terminated. That is, the sub-valve 9 and the valve 12 are closed.

(4) Then, the residual matter, such as moisture, which has remained within the system owing to the purging with steam, is removed with the inert gas 40. For this purpose, the valve 30a is opened to feed part of the burner exhaust gas 25 to the oxygen adsorbent 28 and adsorb oxygen in the burner exhaust gas 25 onto the oxygen adsorbent 28, thereby removing oxygen from the burner exhaust gas 25. By this measure, the inert gas 40 deprived of oxygen is formed.

To carry out purging of the interior of the system with the inert gas 40, the valve 32 is opened. The inert gas 40 flows from the fuel reformer 1 and through the CO conversion catalyst reactor 2, the PROX catalyst reactor 3, and the fuel cell body 4, and is discharged from the anode 18 to the system exhaust gas passage 27 via the valve 39a. By this measure, the residual matter, such as moisture, which has remained in the fuel reformer 1, the CO conversion catalyst reactor 2, the PROX catalyst reactor 3, and the fuel cell body 4, is thoroughly removed.

In forming the inert gas 40, the condenser 34 is actuated to cool the burner exhaust gas 25 through the condenser 34, thereby removing moisture in the burner exhaust gas 25. By this measure, the inert gas 40, which has become dry, is obtained. Moreover, the pump 35 is actuated to increase the volume of the inert gas 40. In keeping the fuel cell body 4 in humid condition, the inert gas 40 may be bypassed without being passed through the fuel cell body 4.

(5) When the purging of the interior of the system with the inert gas 40 is completed, the burner 10 is stopped, and the system is spontaneously cooled. Also, the valve 30a and the valve 32 are closed, and the condenser 34 and the pump 35 are stopped.

The oxygen adsorbent 28, which has adsorbed oxygen, has its oxygen adsorbing function gradually saturated. Thus, the oxygen adsorbent 28 is reduced with a hydrogen gas atmosphere for the purpose of regeneration by the time when next purging with the inert gas 40 is carried out within the system.

According to the present embodiment, during a next operation of the system, in other words, at the time of a next operation for power generation (including the state before the start of the operation for power generation, the state where the reformed gas 23 is formed), the valve 37a is opened to feed the used reformed gas 22 or the unused reformed gas 23 to the oxygen adsorbent 28 via the valve 37a and the pipeline 37b, thereby reducing the oxygen adsorbent 28. On this occasion, the heater 33 is actuated (100° C. or above) to raise the temperature of the oxygen adsorbent 28 (in the case of Cu, to about 200° C.), thereby increasing the efficiency of reduction.

After completion of reduction, the heater 33 is stopped. The condenser 34 is actuated to remove moisture in the reformed gases 22, 23, thereby increasing the efficiency of reduction. Also, the pump 35 is actuated to increase the amounts of the reformed gases 22, 23. The reformed gases 22, 23 after being used for regeneration of the oxygen adsorbent 28 are preferably returned to the reforming catalyst layer 7 by opening the valve 32, but these reformed gases 22, 23 can also be supplied to the burner 10 via a suitable path.

The burner 10 is generally adjusted such that the burner exhaust gas 25 contains about 2% of oxygen. Here, assume that the internal volume of the system is several liters, and the interior of the system is purged with several times that volume (for example, 10 liters) of the inert gas 40. It is now assumed that about 2% of oxygen is removed from the burner exhaust gas 25, and the resulting inert gas 40 is flowed for 1 minute at a flow rate of about 10 liters/minute. In this case, about 0.01 mol (=10 liters×0.02/22.4) of oxygen adsorption is necessary. Hence, if Cu is used as the oxygen adsorbent 28, about 1.3 g of Cu is required.

Test Example

Figure 2:
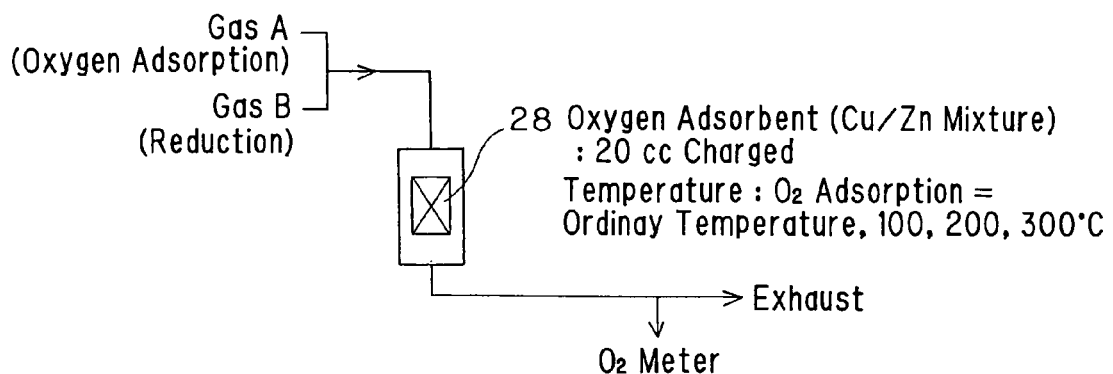
FIG. 2 is a view showing an example of a testing device for oxygen adsorption and reduction.

Using a testing device as shown in FIG. 2, an oxygen adsorption test was conducted under the testing conditions shown in Table 1 below. In the testing device shown in FIG. 2, a Cu/Zn mixture was used as the oxygen adsorbent 28, 20 cc of the Cu/Zn mixture was charged into a container, switching between a gas A for oxygen adsorption and a gas B for reduction is performed so that either gas is introduced into the oxygen adsorbent 28, and an $O_2$ meter (oxygen concentration sensor) is attached to the outlet of the oxygen adsorbent 28 to measure the oxygen concentration.

Using the testing device shown in FIG. 2, the oxygen adsorption test was conducted at an adsorption temperature of 100° C., 200° C. or 300° C., and the gas A at the time of oxygen adsorption at the inlet of the oxygen adsorbent 28 was set to have a composition simulating the burner exhaust gas 25 ($O_2$: 2%, $CO_2$: 10%, $H_2O$: 3%, remainder $N_2$). The dwell time of the gas in the oxygen adsorbent 28 was determined mainly based on a space velocity of 5,000 (l/h). Under these conditions, the effect of the adsorption temperature was confirmed.

Figure 3:
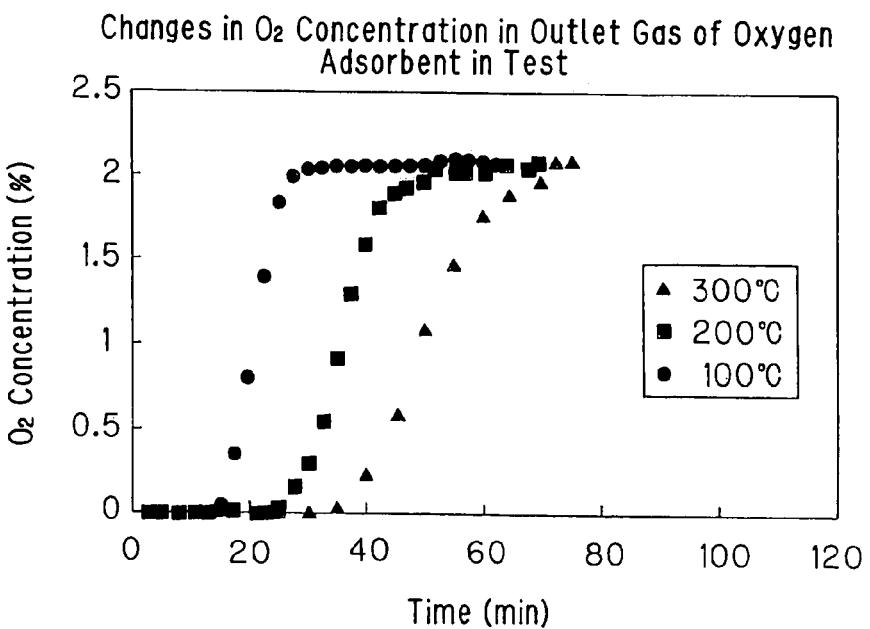
FIG. 3 is a view showing changes in the oxygen concentration in an oxygen adsorbent outlet gas during an oxygen adsorption test.

The results are shown in Table 2. Changes in the oxygen concentration in the gas at the outlet of the oxygen adsorbent 28 during the oxygen adsorption test are shown in FIG. 3. In FIG. 3, the ordinate represents the oxygen concentration (%), and the abscissa represents time (min), the gas flow rate was fixed at 600 liters, the space velocity was fixed at 5,000 (l/h), and the adsorption temperature was selected to be three types, 100° C., 200° C. and 300° C.

TABLE 1

| Type of Gas | Test category | Temp. of adsorbent (° C.) | Gas flow rate (L/h) | Space velocity (l/h) | Gas composition |
|---|---|---|---|---|---|
| A | Oxygen adsorption test | 100<br>200<br>300 | 100<br>600 | 5000<br>30000 | $O_2$: 2%<br>$CO_2$: 10%<br>$H_2O$: 3%<br>$N_2$: Remainder |
| B | Reduction test | 200 | 600 | 30000 | $H_2$: 3%<br>$N_2$: Remainder |

TABLE 2

| Test No. | 1 | 2 | 3 |
|---|---|---|---|
| Space velocity (l/h) | 5000 | 5000 | 5000 |
| Oxygen adsorption temperature (° C.) | 300 | 200 | 100 |
| Amount of oxygen adsorption (L) | 1.62 | 1.18 | 0.71 |
| Minimum oxygen concentration in oxygen adsorption (%) | 0<br>(32 min) | 0<br>(24 min) | 0<br>(14 min) |

Table 2 and FIG. 3 show that at the adsorption temperature of 100° C., the time during which the oxygen concentration in the gas at the outlet of the oxygen adsorbent 28 remained zero was 14 minutes; at the adsorption temperature of 200° C., the time during which the oxygen concentration in the gas at the outlet of the oxygen adsorbent 28 remained zero was 24 minutes; and at the adsorption temperature of 300° C., the time during which the oxygen concentration in the gas at the outlet of the oxygen adsorbent 28 remained zero was 32 minutes.

Accordingly, there was confirmed to be no problem in adding the burner exhaust gas 25 to the oxygen adsorbent 28 to remove oxygen from the burner exhaust gas 25 and form the inert gas 40, and using this inert gas 40 for purging the system.

According to the fuel cell power generation system concerned with the present embodiment described above, and the method for operating it, the following effects can be obtained:

(1) Oxygen in the burner exhaust gas 25 is removed by the oxygen adsorbent 28. Thus, the inert gas 40 with less (substantially no) oxygen than before can be formed.

(2) The interior of the system is purged, with the inert gas 40 being formed. Thus, a storage tank for the inert gas 40, as conventionally used, is not required. Compared with the earlier technologies, space saving and cost reduction can be achieved.

(3) After purging with steam, purging with the inert gas 40 is carried out. Thus, purging takes a short time, the amount of the inert gas 40 used is decreased, and the amount of the oxygen adsorbent 28 can also be rendered small. Hence, the running cost can be decreased.

(4) The oxygen adsorbent 28 having adsorbed oxygen is reduced, whereby the oxygen adsorbent 28 can be regenerated. Thus, the running cost can be decreased, and maintenance and inspection can be facilitated.

(5) The oxygen adsorbent 28 is reduced with the used reformed gas 22 or the unused reformed gas 23, and can be regenerated thereby. Thus, it is not necessary to have a reducing agent anew, and the running cost can be decreased.

(6) In starting the operation or when purging with steam, the fuel gas 6 to be reformed is incorporated in a tiny amount into steam. Thus, oxidation of the interior of the system with steam can be prevented.

According to the present embodiment, the oxygen adsorbent 28 is heated with the use of the heater 33. However, the oxygen adsorbent 28 may be placed, for example, adjacent to the fuel reforming device 60 (for example, inwardly of the heat insulator). By this measure, the oxygen adsorbent 28 can be held at an appropriate temperature by utilizing the heat of the fuel reforming device 60.

SECOND EMBODIMENT

Use of an Oxygen Absorbing Solution

Figure 4:
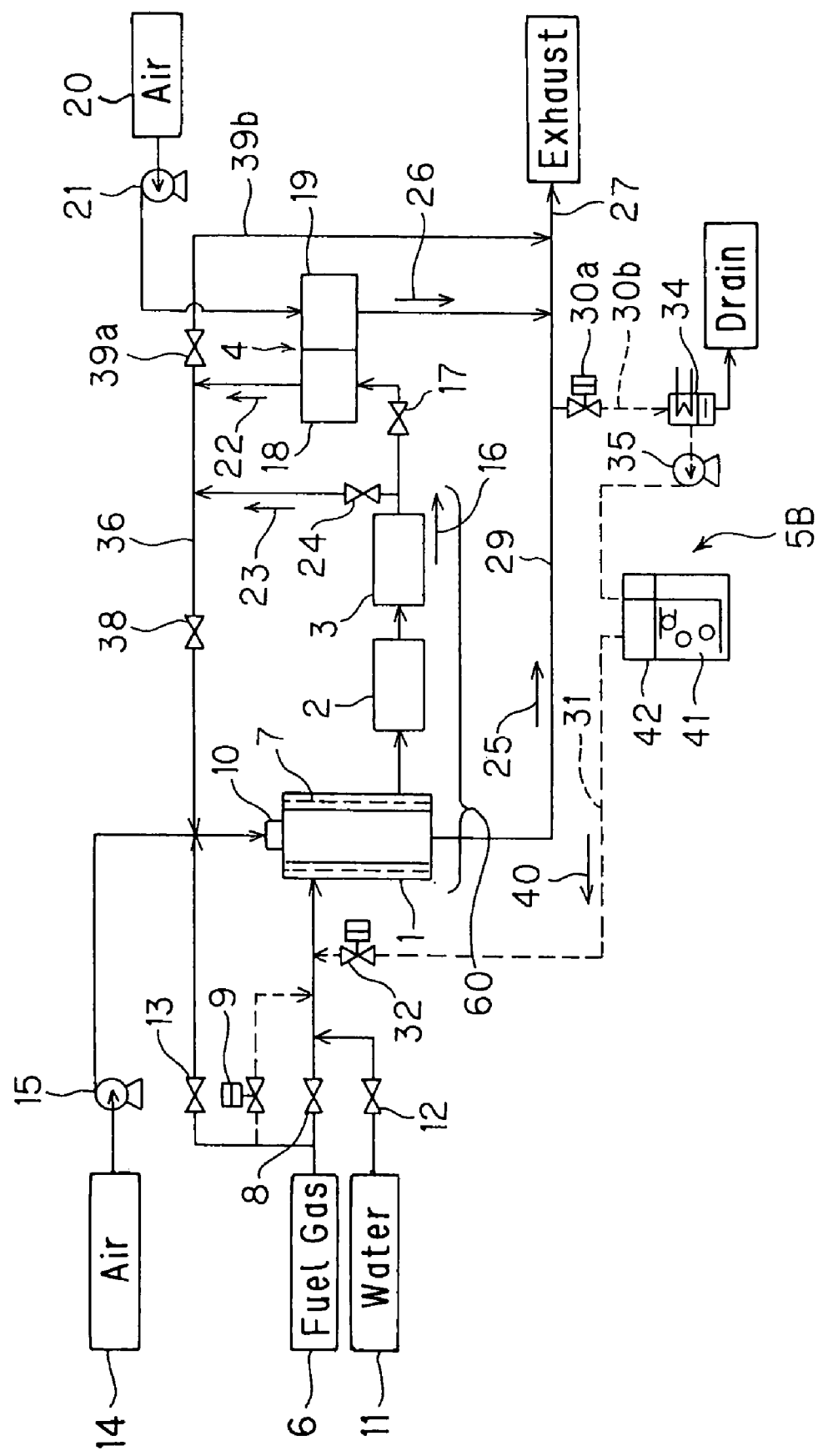
FIG. 4 is a schematic configurational drawing of a second embodiment of a fuel cell power generation system according to the present invention.

A second embodiment of a fuel cell power generation system according to the present invention, and a method for operating it will be described with reference to FIG. 4. FIG. 4 is a schematic configurational drawing of the fuel cell power generation system. However, the same parts as those in the aforementioned first embodiment are assigned the same numerals as the numerals used in the descriptions of the aforementioned first embodiment, whereby duplicate explanations are omitted.

The fuel cell power generation system according to the present embodiment is a fuel cell power generation system equipped with a fuel reforming device 60 and a fuel cell body 4, as shown in FIG. 4. This fuel cell power generation system includes valves 30a, 32, pipelines 30b, 31, a condenser 34, a pump 35, etc. which constitute raw gas feeding means for feeding a burner exhaust gas 25 (raw gas) discharged from a heating burner 10 of the fuel reforming device 60; and an inert gas formation device 5B, as inert gas formation means containing an oxygen absorbing solution 41, which is disposed between the pipelines 30b and 31 and absorbs oxygen in the burner exhaust gas 25, thereby removing oxygen from the burner exhaust gas 25 and forming an inert gas 40.

The inert gas formation device 5B is mainly composed of the oxygen absorbing solution 41. The oxygen absorbing solution 41 is charged into a tank (container) 42. The inlet of the tank 42 is supplied with part or all of the burner exhaust gas 25 via a burner exhaust gas passage 29, the valve 30a, and the pipeline 30b. The outlet of the tank 42 is connected to a fuel reformer 1 via the pipeline 31 and the valve 32.

Any liquid having an oxygen absorbing function can be used as the oxygen absorbing solution 41. For example, a solution of sodium sulfite ($Na_2SO_3$) is named. When this sodium sulfite is used, oxygen is absorbed and removed from the burner exhaust gas 25 in accordance with an oxidation reaction represented by $Na_2SO_3 + \frac{1}{2}O_2 \rightarrow Na_2SO_4$.

That is, the fuel cell power generation system according to the present embodiment corresponds to the fuel cell power generation system according to the aforementioned first embodiment (FIG. 1) in which the inert gas formation device 5B utilizing the oxygen absorbing solution 41 instead of the oxygen adsorbent 28 has been applied, and also the heater 33, the valve 37a and the pipeline 37b have been omitted.

To operate the above-described fuel cell power generation system according to the present embodiment, the same procedure as described in the aforementioned first embodiment is executed.

In stopping the operation of the fuel cell power generation system according to the present embodiment, on the other hand, the following procedure is executed:

(1) After purging with steam performed in the same manner as in the aforementioned first embodiment is completed, residual matter, such as moisture, which has remained within the system owing to the purging with steam, is removed with an inert gas 40. For this purpose, the valve 30a is opened to pass part of the burner exhaust gas 25 into the oxygen absorbing solution 41 and absorb oxygen in the burner exhaust gas 25 into the oxygen absorbing solution 41, thereby removing oxygen from the burner exhaust gas 25. By this measure, the inert gas 40 deprived of oxygen is formed in a vapor phase portion of the container 42 (in the space above the oxygen absorbing solution 41).

To carry out purging of the interior of the system with the inert gas 40, the valve 32 is opened. The inert gas 40 flows from the fuel reformer 1 and through the CO conversion catalyst reactor 2, the PROX catalyst reactor 3, and the fuel cell body 4, and is discharged from the anode 18 to the system exhaust gas passage 27 via the valve 39a. By this measure, the residual matter, such as moisture, which has remained in the fuel reformer 1, the CO conversion catalyst reactor 2, the PROX catalyst reactor 3, and the fuel cell body 4, is thoroughly removed.

In forming the inert gas 40, the condenser 34 is actuated to cool the burner exhaust gas 25 through the condenser 34, thereby removing moisture in the burner exhaust gas 25. By this measure, the inert gas 40, which has become dry, is obtained. Moreover, the pump 35 is actuated to increase of the volume of the inert gas 40.

(2) When the purging of the interior of the system with the inert gas 40 is completed, the burner 10 is stopped, and the system is spontaneously cooled, as in the case of the aforementioned first embodiment. Also, the valve 30a and the valve 32 are closed, and the condenser 34 and the pump 35 are stopped.

The oxygen absorbing solution 41, which has absorbed oxygen, has its oxygen absorbing capacity gradually saturated. Thus, around a point in time when the oxygen absorbing capacity of the oxygen absorbing solution 41 has approached its saturation, the oxygen absorbing solution 41 is replaced by a new oxygen absorbing solution 41 before next purging. For example, the oxygen absorbing solution 41 is replaced at regular intervals of about 1 year or several years.

Let us take an example. As with the first embodiment, assume a case where about 2% of oxygen is removed from the burner exhaust gas 25, and the resulting inert gas 40 is flowed for 1 minute at a flow rate of about 10 liters/minute. In this case, about 0.01 mol (=10 liters×0.02/22.4) of oxygen absorption is necessary per purging. If the system is stopped once daily, for example, the number of stoppages is 365/year, and the required amount of oxygen absorption per year is 3.65 mols (=0.01 mol×365).

Accordingly, when sodium sulfite ($Na_2SO_3$) is used as the oxygen absorbing solution 41, the amount of sodium sulfite (126 g/mol) needed per year is twice that of oxygen, and is 7.3 mols (about 920 g). If the oxygen absorbing solution is a 20 wt. % aqueous solution, about 4.6 liters of the oxygen absorbing solution 41 will become necessary. Moreover, the tank 42 containing the oxygen absorbing solution 41 is required to have a volume of about 6 to 10 liters.

Hence, according to the fuel cell power generation system according to the present embodiment, and the method for operating it, the same effect as that in the aforementioned first embodiment can be obtained.

THIRD EMBODIMENT

Use of an Amine Solution

Figure 5:
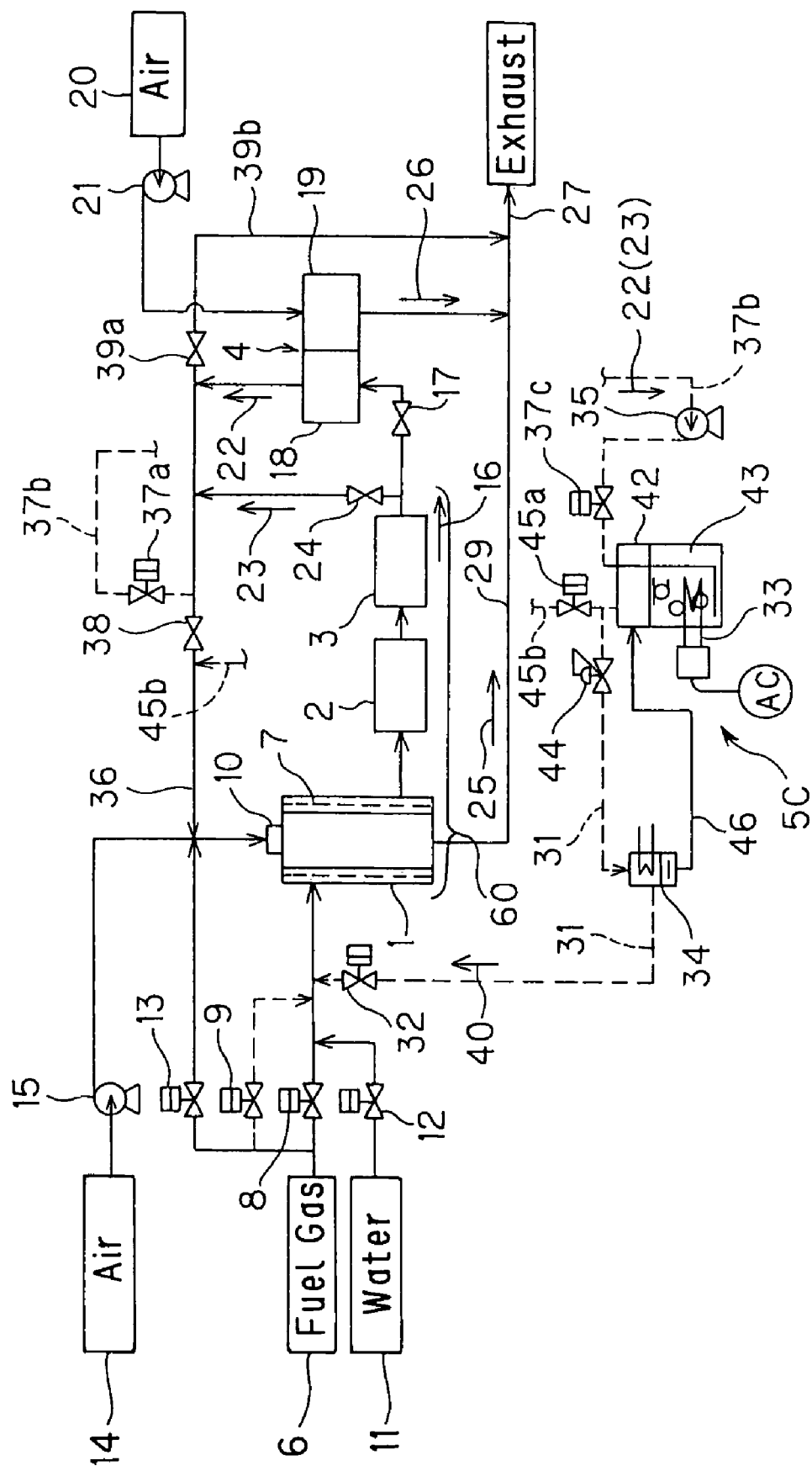
FIG. 5 is a schematic configurational drawing of a third embodiment of a fuel cell power generation system according to the present invention.

A third embodiment of a fuel cell power generation system according to the present invention, and a method for operating it will be described with reference to FIG. 5. FIG. 5 is a schematic configurational drawing of the fuel cell power generation system. However, the same parts as those in the aforementioned first embodiment are assigned the same numerals as the numerals used in the descriptions of the aforementioned first embodiment, whereby duplicate explanations are omitted.

The fuel cell power generation system according to the present embodiment is a fuel cell power generation system equipped with a fuel reforming device 60 and a fuel cell body 4, as shown in FIG. 5. This fuel cell power generation system has an inert gas formation device 5C as inert gas formation means including valves 37a, 37c, a pipeline 37b, a pump 35, a tank 42, etc. which constitute carbon dioxide recovery means containing an aqueous amine solution 43 supplied with an anode exhaust gas 22 discharged from an anode 18 of the fuel cell body 4 to absorb carbon dioxide in the anode exhaust gas 22, and valves 44, 32, a pipeline 31, a heater 33, etc. which constitute carbon dioxide feeding means for heating the aqueous amine solution 43 of the carbon dioxide recovery means to release carbon dioxide from the aqueous amine solution 43 and feeding the carbon dioxide into the fuel reforming device 60.

The fuel cell power generation system according to the present embodiment also includes a valve 45a, a pipeline 45b, etc. constituting raw gas recycling means for supplying the anode exhaust gas 22, from which carbon dioxide has been recovered by the above-mentioned carbon dioxide recovery means, to a burner 10 of the fuel reforming device 60.

The fuel cell power generation system according to the present embodiment further includes a condenser 34, which is moisture recovery means for recovering moisture from carbon dioxide fed into the fuel reforming device 60, and a pipeline 46, etc. as moisture recycling means for returning the moisture recovered by the condenser 34 to the aqueous amine solution 43.

The inert gas formation device 5C is mainly composed of the aqueous amine solution 43 and the heater 33. The aqueous amine solution 43 is charged into a tank 42. The inlet of the tank 42 is supplied with part of the anode exhaust gas 22 from between the valve 38 and the valve 39a on the anode exhaust gas passage 36 via the valve 37a, pipeline 37b, valve 37c and pump 35. As the heater 33, a heater acting with an alternating current power source (AC) is applied.

A vapor phase portion within the tank 42 (i.e., a space above the solution) is connected to the fuel reformer 1 via the pipeline 31 and the valve 32. To the pipeline 31, a pressure regulating valve 44 and the condenser 34 are connected sequentially. The vapor phase portion of the tank 42 is also connected to a portion of the anode exhaust gas passage 36 downstream of the valve 38 via the valve 45a and the pipeline 45b.

As the amine, various amines may be used, such as a primary amine. When the primary amine is used, a carbon dioxide gas absorption reaction, represented by $2RNH_2 + CO_2 \rightarrow (RNH_3)^+ + (RNHCOO)^-$, occurs at atmospheric pressure and at room temperature to 50° C. On the other hand, under the conditions involving an air pressure of 0.8 kg/cm$^2$ and a temperature of about 120° C., a carbon dioxide gas dissipation reaction, represented by $(RNH_3)^+ + (RNHCOO)^- \rightarrow 2RNH_2 + CO_2$, takes place.

That is, the fuel cell power generation system according to the present embodiment is the fuel cell power generation system according to the aforementioned first embodiment (FIG. 1) in which there has been applied the inert gas formation device 5C utilizing the aqueous amine solution 43 instead of the oxygen adsorbent 28, the condenser 34 has been installed downstream of the inert gas formation device 5C, the valve 37c, pressure regulating valve 44, valve 45a and pipeline 45b have been newly added, and the valve 30a and the pipeline 30 have been omitted.

In operating the above-described fuel cell power generation system according to the present embodiment, the same procedure as in the aforementioned first embodiment is executed.

During the operation of the fuel cell power generation system according to the present embodiment, the following procedure is effected:

(1) The valve 37a and the valve 37c are opened, and the pump 35 is actuated to pass part or all of the anode exhaust gas 22 into the aqueous amine solution 43, whereupon carbon dioxide (carbonic acid gas) is absorbed into the aqueous amine solution 43 by a carbon dioxide gas absorption reaction. On this occasion, the valve 45a is kept open so that the anode exhaust gas 22, from which carbon dioxide has been recovered, namely, the gas which has not been absorbed into the aqueous amine solution 43 (i.e., nitrogen, hydrogen, CH4, unabsorbed carbon dioxide, etc.), is supplied to the burner 10 through the anode exhaust gas passage 36 via the pipeline 45b for use in combustion by the burner 10.

(2) When a required amount of carbon dioxide has been absorbed into the aqueous amine solution 43, the valve 37a, the valve 37c, and the valve 45a are closed.

(3) The anode exhaust gas 22 contains about 50% of carbon dioxide, and is thus preferred as a supply source for absorption of carbon dioxide into the aqueous amine solution 43. The unused reformed gas 23, as a surplus, also contains carbon dioxide, and this reformed gas 23 can also be passed into the aqueous amine solution 43 to have its carbon dioxide absorbed into the aqueous amine solution 43.

In terminating the operation of the fuel cell power generation system according to the present embodiment, on the other hand, the following procedure is executed:

(1) After purging with steam performed in the same manner as in the aforementioned first embodiment is completed, prior to purging with the inert gas 40, the valve 13 is closed to flow only air to the burner 10, thereby cooling the fuel reformer 1 to 500° C. or lower. Then, the pump 15 is stopped.

(2) Then, the heater 33 is actuated to heat the aqueous amine solution 43 having absorbed carbon dioxide. When the aqueous amine solution 43 is heated to 120° C. and the vapor pressure within the tank 42 reaches 0.8 kg/cm$^2$, a carbon dioxide gas dissipation reaction occurs. As a result, carbon dioxide is generated from the aqueous amine solution 43 to form the inert gas 40.

(3) The valve 32 is opened to pass the carbon dioxide gas, which has been liberated by heating, through the reforming catalyst layer 7 of the fuel reformer 1, thereby performing purging. The inert gas (carbon dioxide) 40 flows through the fuel reformer 1, CO conversion catalyst reactor 2, PROX catalyst reactor 3, and anode 18 of the fuel cell body 4, and is discharged to the system exhaust gas passage 27 via the valve 39a. Consequently, residual matter, such as moisture, which has remained in the fuel reformer 1, CO conversion catalyst reactor 2, PROX catalyst reactor 3, and fuel cell body 4, is thoroughly removed.

(4) At this time, the pressure is adjusted by the pressure regulating valve 4 so that the carbon dioxide gas is released at 0.8 kg/cm$^2$.

(5) To recover moisture in the inert gas (carbon dioxide) 40 which purges the interior of the system, the condenser 34 is actuated to cool the released carbon dioxide gas and separate the moisture. The separated moisture is returned to the container 43 via the pipeline 46 to recycle the moisture. By this recovery of moisture, a dry carbon dioxide gas is obtained.

(6) After purging of the interior of the system with the inert gas (carbon dioxide) 40 is completed, the entire system is shut down. That is, the heater 33 and the condenser 34 are stopped, and the valve 32 is closed.

The required amount of amine will be described. As an example, assume that the amount of release of the carbon dioxide gas necessary per purging is 1 mol (22.4 liters). In this case, the amount of amine necessary to absorb 1 mol of carbon dioxide gas for one purging is 2 mols (122 g), if the type of the amine is MEA (molecular weight 61). Provided that the aqueous amine solution is a 50 wt. % aqueous solution, about 250 ml of the aqueous amine solution is needed. If it is assumed that the volume of the container 42, including the vapor phase portion, is 600 ml, the container 42 measures 50 mm in diameter by 300 mm in height, and the height of the surface of the solution is about 130 mm.

Hence, according to the fuel cell power generation system concerned with the present embodiment, and the method for operating it, it goes without saying that the same effects as in the aforementioned first embodiment can be obtained, and further the following effects can be obtained:

(1) The absorption and dissipation of carbon dioxide by the aqueous amine solution 43 have semi permanent durability, so that the running cost can be decreased, and maintenance and inspection can be facilitated.

(2) The gas, which has been passed through the aqueous amine solution 43, is returned to the remaining anode exhaust gas 22 that has not been passed through the aqueous amine solution 43. In this manner, the gas can be recycled for combustion by the burner 10. Thus, the running cost can be decreased.

(3) Moisture in carbon dioxide, which has been withdrawn from the aqueous amine solution 43, is recovered and returned to the aqueous amine solution 43. Thus, the aqueous amine solution 43 need not be replenished with moisture from the outside, so that the running cost can be decreased, and maintenance and inspection can be facilitated.

(4) Only air is flowed to the burner 10 during the period from the completion of purging with steam until the start of purging with the inert gas (carbon dioxide) 40 to render the temperature of the fuel reformer 1 lower than the temperature at completion of purging with steam. Thus, purging with the inert gas (carbon dioxide) 40 can be performed preferably.

Even if the unused reformed gas 23, as a surplus, is used instead of the anode exhaust gas 22, the same effects as those in the present embodiment can be obtained.

FOURTH EMBODIMENT

Installation of Oxygen Adsorbent within Fuel Reforming Device

Figure 6:
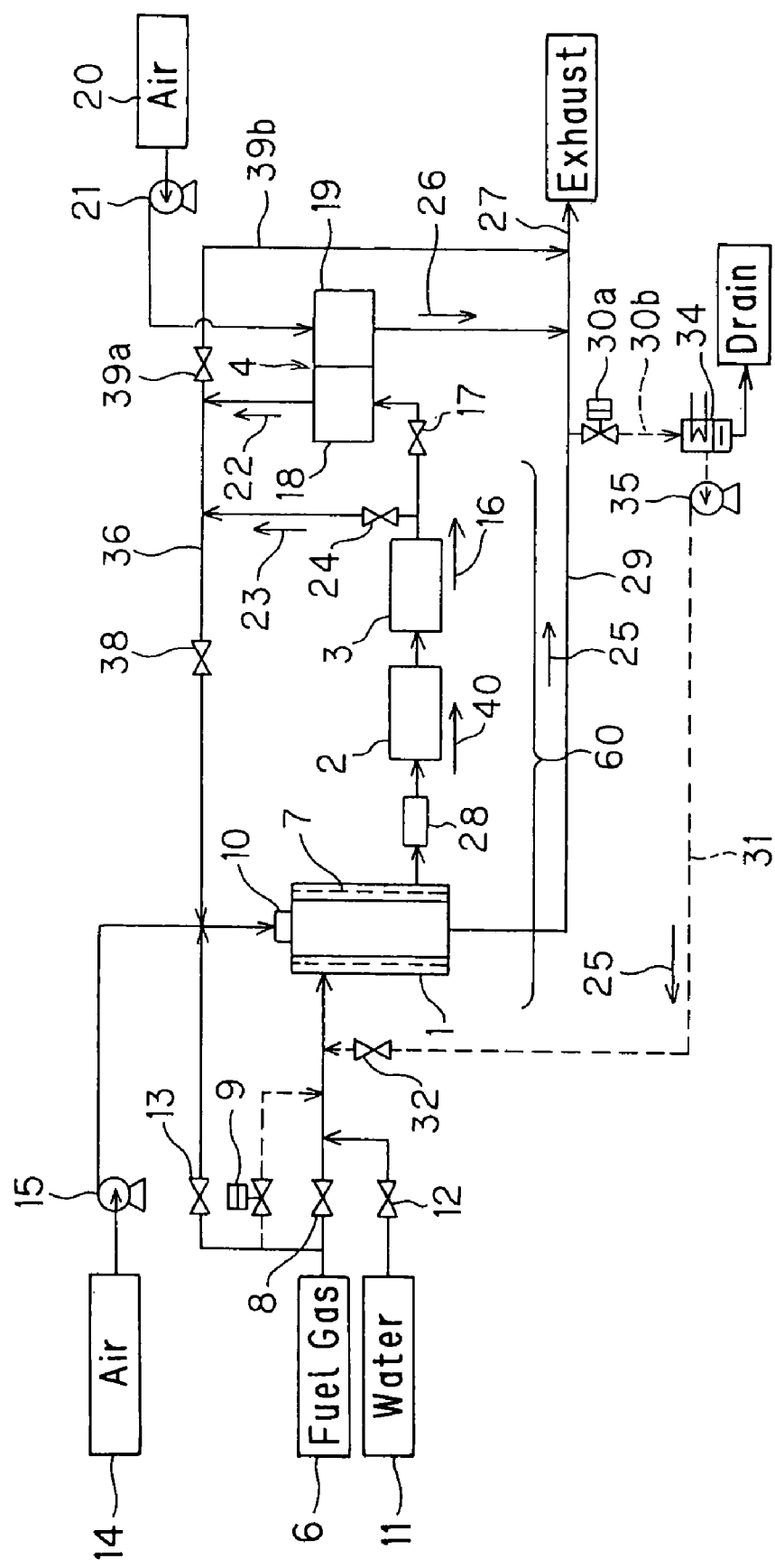
FIG. 6 is a schematic configurational drawing of a fourth embodiment of a fuel cell power generation system according to the present invention.

A fourth embodiment of a fuel cell power generation system according to the present invention, and a method for operating it will be described with reference to FIG. 6. FIG. 6 is a schematic configurational drawing of the fuel cell power generation system. However, the same parts as those in the aforementioned first embodiment are assigned the same numerals as the numerals used in the descriptions of the aforementioned first embodiment, whereby duplicate explanations are omitted.

The fuel cell power generation system according to the present embodiment is the fuel cell power generation system according to the first embodiment (FIG. 1) in which the place of installation of the oxygen adsorbent 28 has been changed, and the heater 33, valve 37a and pipeline 37b have been omitted.

Concretely, the oxygen adsorbent 28 capable of undergoing repeated oxidation and reduction is, in the present embodiment, installed between a fuel reformer 1 and a CO conversion catalyst reactor 2, in other words, between a reforming catalyst layer 7 and a CO conversion catalyst layer, within a fuel reforming device 60 including the fuel reformer 1, the CO conversion catalyst reactor 2, and a PROX catalyst reactor 3, and is charged into a suitable container. The inlet of the container of the oxygen adsorbent 28 is connected to the fuel reformer 1, while the outlet of the container of the oxygen adsorbent 28 is connected to the CO conversion catalyst reactor 2.

A burner exhaust gas passage 29 is connected to the reforming catalyst layer 7 of the fuel reformer 1 via a valve 30a, a pipeline 30b, a condenser 34, a pump 35, a pipeline 31 and a valve 32.

That is, in the aforementioned first embodiment (FIG. 1), the oxygen adsorbent 28 is installed outside the fuel reforming device 60 (i.e., in the raw gas feeding means). In the present embodiment, on the other hand, the oxygen adsorbent 28 is installed within the fuel reforming device 60 (between the reforming catalyst layer 7 and the CO conversion catalyst layer).

During purging, therefore, the valve 30a and the valve 32 are opened, whereby part or all of the burner exhaust gas 25 is taken into the reforming catalyst layer 7 of the fuel reformer 1 from the burner exhaust gas passage 29 via the valve 30a, the pipeline 30b, the condenser 34, the pump 35, the pipeline 31 and the valve 32. Through the reforming catalyst layer 7, the burner exhaust gas 25 is added to the oxygen adsorbent 28 from the inlet of the container. The burner exhaust gas 25 has oxygen inside it adsorbed and removed by the oxygen adsorbent 28, is thereby changed to an inert gas 40, and is then fed sequentially to the CO conversion catalyst reactor 2, PROX catalyst reactor 3 and fuel cell body 4.

During a reforming operation, the valve 30a and the valve 32 are closed, and a reformed gas 16 formed by the reforming catalyst layer 7 is added to the oxygen adsorbent 28 through the inlet of the container and, through the oxygen adsorbent 28, is added to the CO conversion catalyst reactor 2.

During purging, the burner exhaust gas 25 containing oxygen flows through the reforming catalyst layer 7. Thus, it is necessary to use for the reforming catalyst layer 7 a precious metal catalyst, such as Ru, which is an oxidation-resistant catalyst not deteriorated by oxygen, unlike a CO conversion catalyst, such as an LTS catalyst, used in a CO conversion reaction.

Furthermore, the oxygen adsorbent 28 is disposed between the reforming catalyst layer 7 which is not deteriorated by oxygen, and the CO conversion catalyst layer which is liable to deterioration by oxygen. Thus, the CO conversion catalyst layer is passed by the inert gas 40 rid of oxygen, so that the CO conversion catalyst is free from deterioration.

Besides, the oxygen adsorbent 28 is reduced when the reformed gas 16 from the reforming catalyst layer 7 passes therethrough during the reforming operation. During this process, the oxygen adsorption temperature and the oxygen release temperature of the oxygen adsorbent 28 are 200° C. to 300° C., based on the results of the tests described in the aforementioned first embodiment. Thus, the gas temperature on the side upstream of the CO conversion catalyst layer is kept at about 250° C., thereby obviating the need for an electrical heater (see the numeral 33 in FIG. 1) or the like for heating the oxygen adsorbent 28.

In stopping the operation of the fuel cell power generation system according to the present embodiment, the following procedure is executed:

(1) After purging with steam performed in the same manner as in the aforementioned first embodiment is completed, residual matter, such as moisture, which has remained within the system owing to the purging with steam, is removed with the burner exhaust gas 25 and the inert gas 40. For this purpose, the valve 30a and the valve 32 are opened to flow part or all of the burner exhaust gas 25 to the fuel reformer 1. By this measure, the fuel reformer 1 is purged with the burner exhaust gas 25, and the residual matter, such as moisture, which has remained in the fuel reformer 1 is thoroughly removed.

As stated earlier, there is no problem in purging the reforming catalyst layer 7 with the burner exhaust gas 25. The oxygen adsorbent 28 removes oxygen in the burner exhaust gas 25, which has passed through the reforming catalyst layer 7, by adsorbing the oxygen. That is, oxygen is removed from the burner exhaust gas 25 by the oxygen adsorbent 28, ahead of the CO conversion catalyst layer which is prone to deterioration by oxygen. As a result, the inert gas 40, cleared of oxygen, flows through the CO conversion catalyst reactor 2, the PROX catalyst reactor 3, and the anode of the fuel cell body 4, and is discharged to the system exhaust gas passage 27 via the valve 39a. Thus, the residual matter, such as moisture, which has remained in the CO conversion catalyst reactor 2, the PROX catalyst reactor 3, and the fuel cell body 4, can be thoroughly removed.

(2) When the purging with the burner exhaust gas 25 and the inert gas 40 formed therefrom is completed, the burner 10 is stopped, and the system is spontaneously cooled. Also, the valve 30a and the valve 32 are closed, and the condenser 34 and the pump 35 are stopped.

The oxygen adsorbent 28, which has adsorbed oxygen, is automatically reduced in the present embodiment, because the reformed gas 16 from the fuel reformer 1 is added to the oxygen adsorbent 28 during the next operation of the system, in other words, during the next reforming operation.

Hence, according to the fuel cell power generation system concerned with the present embodiment, and the method for operating it, it goes without saying that the same effects as in the aforementioned first embodiment can be obtained, and further the following effects can be obtained:

(1) Since the electrical heater 33 or the like is unnecessary, the initial cost can be decreased.

(2) Since the oxygen adsorbent 28 is reduced with the reformed gas 16 from the fuel reformer 1, a special reducing agent is not needed.

Heat generated by the oxidation-reduction reaction of the oxygen adsorbent 28 may adversely affect the catalyst within the fuel reforming device 60, especially, LTS catalyst. To prevent this adverse influence, it is preferred to provide a heat insulating layer using, for example, vacuum heat insulation, or a heat exchange portion, between the oxygen adsorbent 28 and the CO conversion catalyst reactor 2.

FIFTH EMBODIMENT

Installation of Oxygen Adsorbent within Fuel Reforming Device

Figure 7:
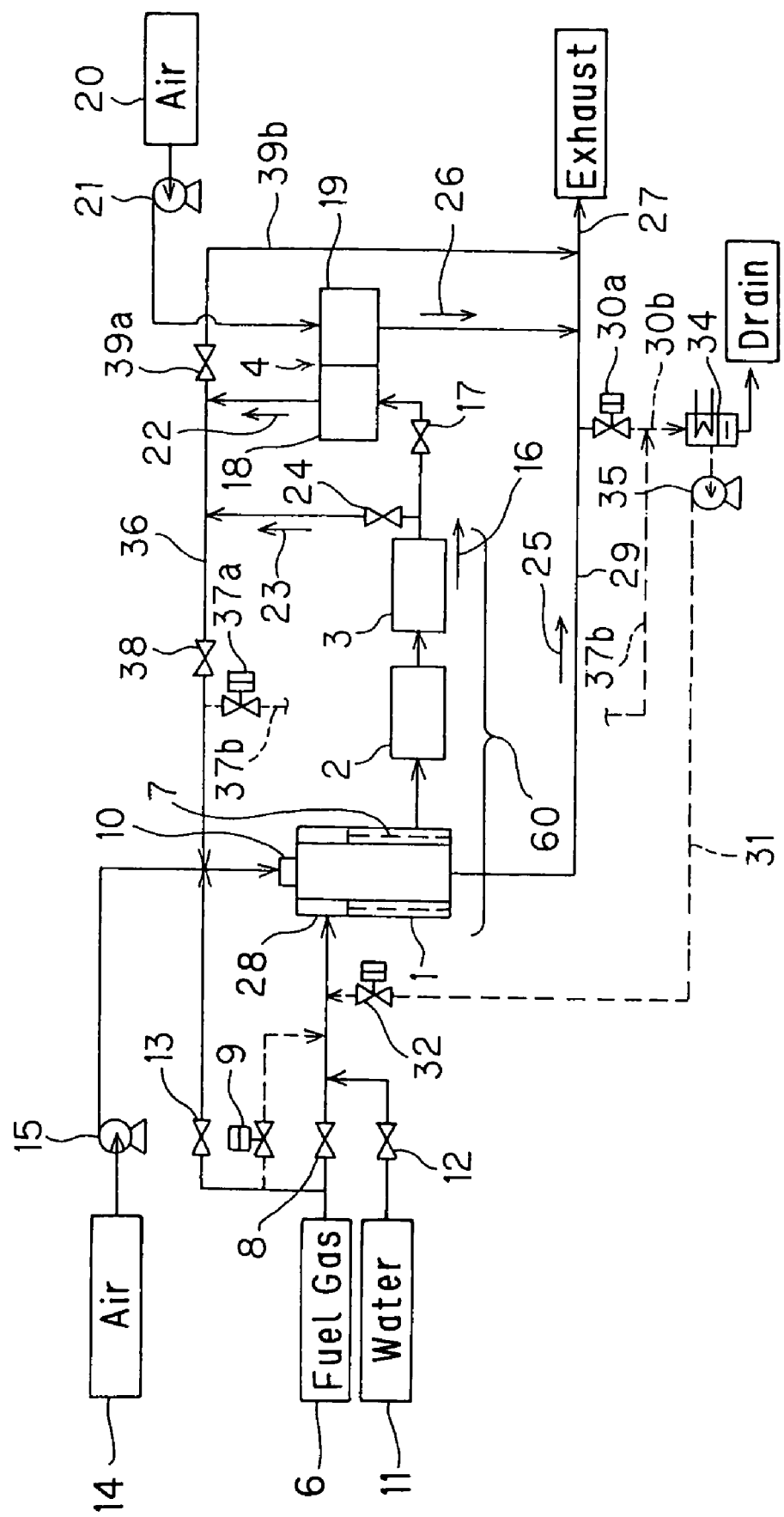
FIG. 7 is a schematic configurational drawing of a fifth embodiment of a fuel cell power generation system according to the present invention.

A fifth embodiment of a fuel cell power generation system according to the present invention, and a method for operating it will be described with reference to FIG. 7. FIG. 7 is a schematic configurational drawing of the fuel cell power generation system. However, the same parts as those in the aforementioned first embodiment are assigned the same numerals as the numerals used in the descriptions of the aforementioned first embodiment, whereby duplicate explanations are omitted.

The fuel cell power generation system according to the present embodiment is the fuel cell power generation system according to the first embodiment (FIG. 1) in which the place of installation of the oxygen adsorbent 28 has been changed, and the heater 33 has been omitted.

Concretely, the oxygen adsorbent 28 capable of undergoing repeated oxidation and reduction is, in the present embodiment, installed in a portion of a fuel reformer 1 upstream of a reforming catalyst layer 7, in other words, between inlet ports of the fuel reformer 1 for a fuel gas 6 and water 11 and the reforming catalyst layer 7, within a fuel reforming device 60, and is packed into other layer communicating with the reforming catalyst layer 7.

In stopping the operation of the fuel cell power generation system according to the present embodiment, the following procedure is executed:

(1) After purging with steam performed in the same manner as in the aforementioned first embodiment is completed, residual matter, such as moisture, which has remained within the system owing to the purging with steam, is removed with the inert gas 40. For this purpose, the valve 30a and the valve 32 are opened, and the pump 35 is actuated to flow part of the burner exhaust gas 25 to the fuel reformer 1. Within the fuel reformer 1, oxygen in the burner exhaust gas 25 is adsorbed and removed by a layer of the oxygen adsorbent 28 placed in the preceding stage to form the inert gas 40.

The resulting inert gas 40 flows through the reforming catalyst layer 7 within the fuel reformer 1, the CO conversion catalyst reactor 2, the PROX catalyst reactor 3, and the anode 18 of the fuel cell body 4, and is discharged to the system exhaust gas passage 27 via the valve 39a. By this measure, the residual matter, such as moisture, which has remained in the reforming catalyst layer 7 within the fuel reformer 1, the CO conversion catalyst reactor 2, the PROX catalyst reactor 3, and the fuel cell body 4, can be thoroughly removed.

In forming the inert gas 40, the condenser 34 is actuated, and the burner exhaust gas 25 is passed through the condenser 34, whereby the burner exhaust gas 25 is cooled, and moisture in the burner exhaust gas 25 is removed. Consequently, the inert gas, which has become dry, is obtained. In keeping the fuel cell body 4 in humid condition, the inert gas 40 may be bypassed without being passed through the fuel cell body 4.

(2) When the purging of the interior of the system with the inert gas 40 is completed, the burner 10 is stopped, and the system is spontaneously cooled. Also, the valve 30a and the valve 32 are closed, and the condenser 34 and the pump 35 are stopped.

The oxygen adsorbent 28, which has adsorbed oxygen, has its oxygen adsorbing function gradually saturated. Thus, the oxygen adsorbent 28 is reduced with a hydrogen gas atmosphere for the purpose of regeneration by the time when next purging of the interior of the system with the inert gas 40 is carried out.

According to the present embodiment, like the aforementioned first embodiment, during a next operation of the system, in other words, at the time of a next operation for power generation (including the state before the start of the operation for power generation, the state where the reformed gas 23 is formed), the valve 37a is opened to feed the used reformed gas 22 or the unused reformed gas 23 to the oxygen adsorbent 28 via the valve 37a and the pipeline 37b, thereby reducing the oxygen adsorbent 28.

The reformed gases 22, 23 after being used for regeneration of the oxygen adsorbent 28 are preferably returned to the reforming catalyst layer 7 by opening the valve 32, but these reformed gases 22, 23 can also be supplied to the burner 10 by a suitable path.

Hence, according to the fuel cell power generation system concerned with the present embodiment, and the method for operating it, it goes without saying that the same effects as in the aforementioned first embodiment can be obtained, and the oxygen adsorbent 28 can be heated to the reduction temperature by the burner 10 of the fuel reforming device 60. Thus, an electrical heater (see the numeral 33 in FIG. 1) or the like for reductive regeneration is not needed, and the running cost can be decreased further.

Figure 8:
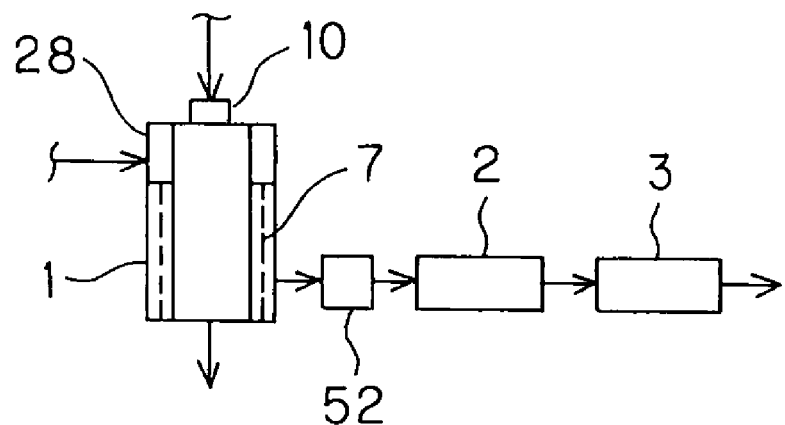
FIG. 8 is a schematic configurational drawing of essential parts of another example of the fifth embodiment of the fuel cell power generation system according to the present invention.

In decreasing the moisture in the inert gas 40, a water adsorbent 52, for example, may be provided between the fuel reformer 1 and the CO conversion catalyst reactor 2 as shown in FIG. 8, instead of using the condenser 34, the pump 35, etc. As the water adsorbent 52, silica gel, zeolite, or molecular sieve, for example, can be applied.

Figure 9:
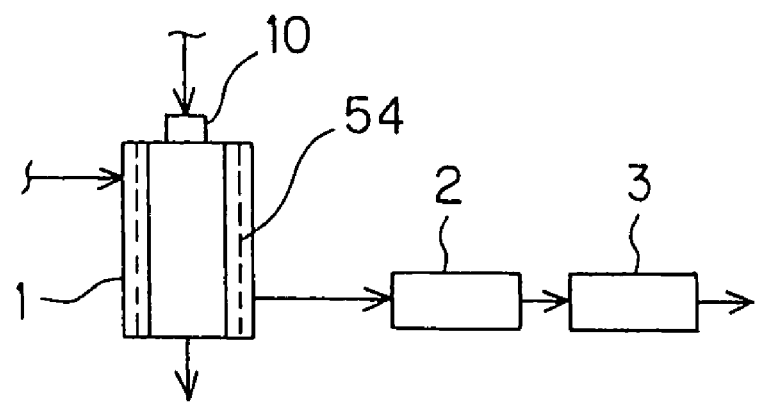
FIG. 9 is a schematic configurational drawing of essential parts of still another example of the fifth embodiment of the fuel cell power generation system according to the present invention.

In the present embodiment, moreover, the reforming catalyst layer 7 and the layer of the oxygen adsorbent 28 are separately provided within the fuel reformer 1, as shown in FIG. 7. However, if a catalyst which is not deteriorated by oxygen is used for the reforming catalyst layer 7, for example, the oxygen adsorbent 28 can be provided in the reforming catalyst layer 7, that is, a layer 54 of a mixture of a reforming catalyst and an oxygen adsorbent can be provided within the fuel reformer 1, as shown in FIG. 9. This contrivance makes it possible to avoid a double-layer configuration within the fuel reformer 1 as shown in FIG. 7, and simplify the structure of the fuel reformer 1.

SIXTH EMBODIMENT

Inert Gas from Air as Raw Material

Figure 10:
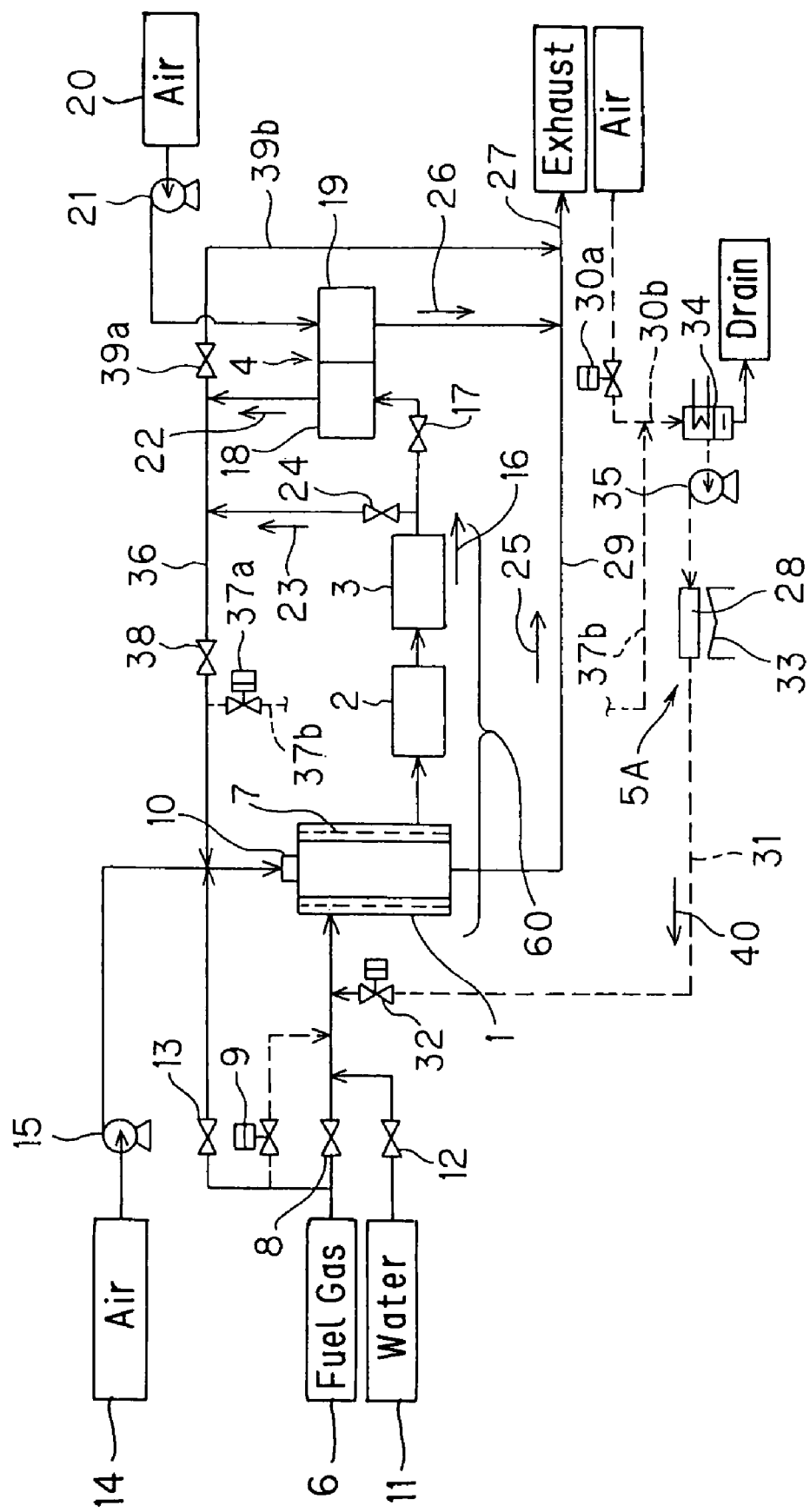
FIG. 10 is a schematic configurational drawing of a sixth embodiment of a fuel cell power generation system according to the present invention.

A sixth embodiment of a fuel cell power generation system according to the present invention, and a method for operating it will be described with reference to FIG. 10. FIG. 10 is a schematic configurational drawing of the fuel cell power generation system. However, the same parts as those in the aforementioned first embodiment are assigned the same numerals as the numerals used in the descriptions of the aforementioned first embodiment, whereby duplicate explanations are omitted.

The fuel cell power generation system according to the present embodiment is the fuel cell power generation system according to the first embodiment (FIG. 1) in which the positions of connection of the valve 30a and the pipeline 30b have been changed.

Concretely, in the present embodiment, the valve 30a and the pipeline 30b are brought into communication with the outside without being connected to the burner exhaust gas passage 29.

That is, in the aforementioned first embodiment (FIG. 1), the burner exhaust gas 25 is used as the starting material (raw gas) for the inert gas 40. In the present embodiment, on the other hand, air outside the system is used as the starting material (raw gas) for the inert gas 40.

At the time of purging, therefore, the valve 30a and the valve 32 are opened, and the condenser 34 and the pump 35 are actuated, whereby air from the outside is taken into the oxygen adsorbent 28. Oxygen in this air is adsorbed and removed by the oxygen adsorbent 28 to form the inert gas 40. The inert gas 40 is then fed sequentially to the CO conversion catalyst reactor 2, PROX catalyst reactor 3 and fuel cell body 4.

In stopping the operation of the fuel cell power generation system according to the present embodiment, the following procedure is executed:

(1) After purging with steam performed in the same manner as in the aforementioned first embodiment is completed, residual matter, such as moisture, which has remained within the system owing to the purging with steam, is removed with the inert gas 40. For this purpose, the action of the burner 10 is stopped, and spontaneous cooling of the system is started. Also, the valve 30a and the valve 32 are opened, and the condenser 34 and the pump 35 are actuated, whereby air outside the system is taken into the oxygen adsorbent 28. Oxygen in this air is adsorbed and removed by the oxygen adsorbent 28 to form the inert gas 40. The resulting inert gas 40 is flowed into the fuel reformer 1 via the pipeline 31 and the valve 32. As a result, the fuel reformer 1 is purged with the inert gas 40, whereby the residual matter, such as moisture, which has remained in the fuel reformer 1 is thoroughly removed.

(2) When the purging with the inert gas 40 is completed, the valve 30a and the valve 32 are closed, and the condenser 34 and the pump 35 are stopped.

Hence, according to the fuel cell power generation system concerned with the present embodiment, and the method for operating it, it goes without saying that the same effects as in the aforementioned first embodiment can be obtained, and further the following effects can be obtained:

(1) Since the inert gas 40 can be obtained without the use of the burner exhaust gas 25, the amount of consumption of the fuel gas 6 can be decreased, and the running cost can be decreased.

With the present embodiment, the inert gas 40 is formed with the use of outside air. However, the inert gas 40 can be formed, for example, with the use of exhaust air 26 discharged from the cathode 19 of the fuel cell body 4.

OTHER EMBODIMENTS

With the foregoing respective embodiments, residual matter is removed from within the system with the initial use of steam. However, there is no harm in purging the interior of the system with the inert gas from the beginning, without using steam.

The junction between the anode exhaust gas passage 36 and the pipeline 37b in the aforementioned first and third embodiments may be located upstream or downstream of the valve 38.

In the aforementioned first, second, and fourth to sixth embodiments, like the aforementioned third embodiment, it is possible to perform the treatment which comprises closing the valve 13 to pass only air to the burner 10, thereby cooling the fuel reformer 1 to 500° C. or lower, after completion of purging with steam.

In the aforementioned second, fourth and fifth embodiments, like the aforementioned sixth embodiment, the inert gas 40 can be formed by using air outside the system as the raw gas, or the inert gas 40 can be formed by using the exhaust air 26, which has been discharged from the cathode 19 of the fuel cell body 4, as the raw gas.

The inert gas formation methods or means in the aforementioned first to sixth embodiments may be combined in suitable plural numbers to form the inert gas, and the inert gas can be used for purging.

In the aforementioned first to sixth embodiments, a desulfurization catalyst reactor provided with a desulfurization catalyst can be provided upstream of the reforming catalyst reactor 1. As the desulfurization catalyst, zeolite or the like can be applied. Such a desulfurization catalyst reactor generally operates at the ordinary temperature.

The fuel cell power generation system according to the first invention is a fuel cell power generation system equipped with a fuel reforming device and a fuel cell body, the fuel cell power generation system comprising: raw gas feeding means for feeding into the fuel reforming device at least one raw gas among a burner exhaust gas discharged from a heating burner of the fuel reforming device, exhaust air discharged from a cathode of the fuel cell body, and air from outside the system; and inert gas formation means including an oxidizable and reducible oxygen adsorbent which adsorbs oxygen in the raw gas to remove oxygen from the raw gas and form an inert gas. Hence, the inert gas with a lower (substantially no) oxygen content than those by the earlier technologies can be formed. Thus, the LTS catalyst for CO conversion is not deteriorated by purging with the inert gas. Moreover, the oxygen adsorbent can be reused multiple times by undergoing reduction after adsorbing oxygen. Furthermore, purging can be performed while the inert gas is being formed. As a result, residual matter such as a combustible gas or moisture, and oxygen can be reliably removed, without being left within the fuel reforming device, in a simple manner with a compact configuration at a low cost.

The fuel cell power generation system according to the second invention is that of the first invention, further comprising adsorbent reduction means for reducing the oxygen adsorbent which has adsorbed oxygen. Thus, the oxygen adsorbent can be reused many times.

The fuel cell power generation system according to the third invention is that of the first or second invention, wherein the oxygen adsorbent is disposed in at least one location among a location in the raw gas feeding means, a location between a reforming catalyst layer and a CO conversion catalyst layer provided in the fuel reforming device, a location upstream of the reforming catalyst layer within the fuel reforming device, and a location in the reforming catalyst layer provided in the fuel reforming device. Thus, if the oxygen adsorbent is disposed in the raw gas feeding means, the place of installation of the inert gas formation means can be set freely. If the oxygen adsorbent is disposed between the reforming catalyst layer and the CO conversion catalyst layer provided in the fuel reforming device, a special means for heating the oxygen adsorbent is unnecessary. If the oxygen adsorbent is disposed upstream of the reforming catalyst layer within the fuel reforming device, the oxygen adsorbent can be used as a reforming catalyst, even when it is a catalyst which is deteriorated by oxygen, and a special means for heating the oxygen adsorbent is unnecessary. If the oxygen adsorbent is disposed in the reforming catalyst layer provided in the fuel reforming device, a special means for heating the oxygen adsorbent is unnecessary.

The fuel cell power generation system according to the fourth invention is that of any one of the first to third inventions, wherein the oxygen absorber comprises at least one of chromium (Cr), manganese (Mn) iron (Fe), cobalt (Co), nickel (Ni), copper (Cu), and zinc (Zn). Thus, oxygen can be adsorbed reliably.

The fuel cell power generation system according to the fifth invention is a fuel cell power generation system equipped with a fuel reforming device and a fuel cell body, the fuel cell power generation system further comprising raw gas feeding means for feeding into the fuel reforming device at least one raw gas among a burner exhaust gas discharged from a heating burner of the fuel reforming device, exhaust air discharged from a cathode of the fuel cell body, and air from outside the system; and inert gas formation means including an oxygen absorbing solution which absorbs oxygen in the raw gas to remove oxygen from the raw gas and generate an inert gas. Hence, the inert gas with a lower (substantially no) oxygen content than those by the earlier technologies can be formed. Thus, the LTS catalyst for CO conversion is not deteriorated by purging with the inert gas. Moreover, purging can be performed while the inert gas is being formed. As a result, residual matter such as a combustible gas or moisture, and oxygen can be reliably removed, without being left within the fuel reforming device, in a simple manner with a compact configuration at a low cost.

The fuel cell power generation system according to the sixth invention is that of the fifth invention, wherein the oxygen absorbing solution is an $Na_2SO_3$ solution. Thus, oxygen can be absorbed reliably.

The fuel cell power generation system according to the seventh invention is a fuel cell power generation system equipped with a fuel reforming device and a fuel cell body, the fuel cell power generation system further comprising inert gas formation means including: carbon dioxide recovery means including an aqueous amine solution which is fed with at least one raw gas among an anode exhaust gas discharged from an anode of the fuel cell body, and a reformed gas formed by reforming in the fuel reforming device, to absorb carbon dioxide in the raw gas; and carbon dioxide feeding means adapted to heat the aqueous amine solution of the carbon dioxide recovery means, thereby releasing carbon dioxide from the aqueous amine solution, and feed the carbon dioxide into the fuel reforming device. Thus, the inert gas (carbon dioxide) free from oxygen, as compared with the earlier technologies, can be formed. The absorption and dissipation of carbon dioxide by the aqueous amine solution have semipermanent durability. Moreover, purging can be performed while the inert gas is being formed. As a result, residual matter such as a combustible gas or moisture, and oxygen can be reliably removed, without being left within the fuel reforming device, in a simple manner with a compact configuration at a low cost.

The fuel cell power generation system according to the eighth invention is that of the seventh invention, further comprising raw gas recycling means for supplying the raw gas, from which carbon dioxide has been recovered by the carbon dioxide recovery means, to the burner of the fuel reforming device. Thus, the raw gas can be recycled as a fuel for the burner.

The fuel cell power generation system according to the ninth invention is that of the seventh or eighth invention, further comprising moisture recovery means for recovering moisture from the carbon dioxide fed into the fuel reforming device, and moisture recycling means for returning the moisture, which has been recovered by the moisture recovery means, to the aqueous amine solution of the carbon dioxide recovery means. Thus, there is no need to replenish the aqueous amine solution with water from the outside.

The method for operating a fuel cell power generation system according to the tenth invention is a method for operating the fuel cell power generation system according to any one of the first to fourth inventions, comprising forming the inert gas by the inert gas formation means, and removing residual matter, which has remained within the fuel reforming device, with the inert gas for inert gas purging, in stopping an operation for power generation. Hence, the inert gas with a lower (substantially no) oxygen content than those by the earlier technologies can be formed. Thus, the LTS catalyst for CO conversion is not deteriorated by purging with the inert gas. Moreover, purging can be performed while the inert gas is being formed. Furthermore, the oxygen adsorbent can be reused many times by being reduced after adsorbing oxygen. As a result, residual matter such as a combustible gas or moisture, and oxygen can be reliably removed, without being left within the fuel reforming device, in a simple manner with a compact configuration at a low cost.

The method for operating a fuel cell power generation system according to the eleventh invention is that of the tenth invention, comprising reducing the oxygen adsorbent of the inert gas formation means with a reformed gas formed by reforming in the fuel reforming device, or an anode exhaust gas discharged from an anode of the fuel cell body, thereby performing regeneration of the oxygen adsorbent of the inert gas formation means. Thus, a special reducing agent is not necessary.

The method for operating a fuel cell power generation system according to the twelfth invention is that of the eleventh invention, comprising performing the regeneration in carrying out an operation for power generation. Thus, regeneration treatment can be performed with high efficiency.

The method for operating a fuel cell power generation system according to the thirteenth invention is a method for operating the fuel cell power generation system of the fifth or sixth invention, comprising forming the inert gas by the inert gas formation means, and removing residual matter, which has remained within the fuel reforming device, with the inert gas for inert gas purging, in stopping an operation for power generation. Hence, the inert gas with a lower (substantially no) oxygen content than those by the earlier technologies can be formed. Thus, the LTS catalyst for CO conversion is not deteriorated by purging with the inert gas. Moreover, purging can be performed while the inert gas is being formed. As a result, residual matter such as a combustible gas or moisture, and oxygen can be reliably removed, without being left within the fuel reforming device, in a simple manner with a compact configuration at a low cost.

The method for operating a fuel cell power generation system according to the fourteenth invention is a method for operating the fuel cell power generation system of any one of the seventh to ninth inventions, comprising recovering carbon dioxide in the raw gas by the carbon dioxide recovery means of the inert gas formation means during an operation for power generation, and actuating the carbon dioxide feeding means of the inert gas formation means to form an inert gas from the aqueous amine solution, thereby removing residual matter, which has remained within the fuel reforming device, for inert gas purging, in stopping the operation for power generation. Thus, the inert gas (carbon dioxide) free from oxygen, as compared with the earlier technologies, can be formed. The absorption and dissipation of carbon dioxide by the aqueous amine solution have semipermanent durability. As a result, residual matter such as a combustible gas or moisture, and oxygen can be reliably removed, without being left within the fuel reforming device, in a simple manner with a compact configuration at a low cost.

The method for operating a fuel cell power generation system according to the fifteenth invention is that of the fourteenth invention, comprising supplying the raw gas, from which carbon dioxide has been recovered by the carbon dioxide recovery means, to the burner of the fuel reforming device during the operation for power generation. Thus, the raw gas can be recycled as a fuel for the burner.

The method for operating a fuel cell power generation system according to the sixteenth invention is that of the fourteenth or fifteenth invention, comprising recovering moisture from the carbon dioxide, which is fed into the fuel reforming device by the carbon dioxide feeding means, and returning the moisture to the aqueous amine solution of the carbon dioxide recovery means, in stopping the operation for power generation. Thus, there is no need to replenish the aqueous amine solution with water from the outside.

The method for operating a fuel cell power generation system according to the seventeenth invention is that of any one of the tenth to sixteenth inventions, comprising removing the residual matter within the fuel reforming device with steam before purging the interior of the fuel reforming device with the inert gas. Thus, the amount of the inert gas may be small, and the amount of the oxygen adsorbent, the oxygen absorbing solution, or the aqueous amine solution may be small.

The method for operating a fuel cell power generation system according to the eighteenth invention is that of the seventeenth invention, comprising removing the residual matter within the fuel reforming device with steam, then flowing only air to the burner of the fuel reforming device to cool the fuel reforming device, and then purging the interior of the fuel reforming device with the inert gas. Thus, the amount of the inert gas may be small, and the amount of the oxygen adsorbent, the oxygen absorbing solution, or the aqueous amine solution may be small.

The method for operating a fuel cell power generation system according to the nineteenth invention is that of the seventeenth or eighteenth invention, wherein the steam for removing the residual matter within the fuel reforming device has a fuel gas incorporated therein, the fuel gas being in an amount necessary and sufficient to prevent oxidation within the fuel reforming device. Thus, the prevention of oxidation within the fuel reforming device can be performed in a simple manner at a low cost.

The method for operating a fuel cell power generation system according to the twentieth invention is that of any one of the tenth to nineteenth inventions, comprising actuating only the burner of the fuel reforming device to heat and raise the temperature of the fuel reforming device; feeding steam to the fuel reforming device during a rise in the temperature of the fuel reforming device, the steam containing a necessary and sufficient amount of a fuel gas to prevent oxidation within the fuel reforming device; and supplying the fuel gas, in a necessary amount according to the actuation of the fuel cell body, after completion of the rise in the temperature of the fuel reforming device, to start an operation for power generation. Thus, the rise in the temperature of the fuel reforming device is rapid, and the oxidation of the interior of the fuel reforming device with steam can be prevented in a simple manner at a low cost.

INDUSTRIAL APPLICABILITY

The present invention can provide a fuel cell power generation system, which can reliably remove residual matter, such as a combustible gas or moisture, and oxygen, without leaving them within a fuel reforming device, at a low cost and with a compact configuration, and a method for operating the fuel cell power generation system. The present invention can afford industrially very beneficial results.

The invention claimed is:

1. A fuel cell power generation apparatus comprising:
   a fuel reforming device operable to reform a gas;
   a fuel cell body including an anode, the fuel cell body being operable to discharge an anode exhaust gas from the anode;
   raw gas feeding means for feeding into the fuel reforming device at least one raw gas of a burner exhaust gas discharged from a heating burner of the fuel reforming device, exhaust air discharged from a cathode of the fuel cell body, and air from outside the fuel cell power generation apparatus;
   inert gas formation means for removing oxygen from the at least one raw gas and generating an inert gas, the inert gas formation means including an oxidizable and reducible oxygen adsorbent; and
   adsorbent reduction means for reducing the oxygen adsorbent by feeding the reformed gas from the fuel reforming device or the anode exhaust gas from the fuel cell body into the oxygen adsorbent of the inert gas formation means, wherein
   the oxidizable and reducible oxygen adsorbent includes at least one of chromium (Cr), manganese (Mn), iron (Fe), cobalt (Co), nickel (Ni), copper (Cu), and zinc (Zn), and
   the oxygen adsorbent is disposed in at least one of a location between a reforming catalyst layer and a CO conversion catalyst layer provided in the fuel reforming device, a location upstream of the reforming catalyst layer within the fuel reforming device, and a location in the reforming catalyst layer provided in the fuel reforming device.

2. A method for operating the fuel cell power generation apparatus of claim 1, the method comprising:
   forming the inert gas by said inert gas formation means; and
   removing residual matter, which has remained within the fuel reforming device, with the inert gas for inert gas purging, in stopping an operation for power generation.

3. The method according to claim 2, further comprising:
   reducing the oxygen adsorbent of said inert gas formation means with the reformed gas formed by reforming in the fuel reforming device or the anode exhaust gas discharged from the anode of the fuel cell body, thereby performing regeneration of the oxygen adsorbent of said inert gas formation means.

4. The method according to claim 3, further comprising:
   performing said reducing in carrying out an operation for power generation.

5. The method according to claim 2, wherein said removing comprises:
   removing the residual matter within the fuel reforming device with steam; and
   then purging an interior of the fuel reforming device with the inert gas.

6. The method according to claim 5, wherein said removing comprises:
   removing the residual matter within the fuel reforming device with the steam;
   then flowing only air to the heating burner of the fuel reforming device to cool the fuel reforming device; and
   then purging the interior of the fuel reforming device with the inert gas.

7. The method according to claim 5, wherein
   the steam for removing the residual matter within the fuel reforming device has a fuel gas incorporated therein, the fuel gas being in an amount necessary and sufficient to prevent oxidation within the fuel reforming device.

8. The method according to claim 2, further comprising:
   actuating only the heating burner of the fuel reforming device to heat and raise a temperature of the fuel reforming device;

feeding steam to the fuel reforming device during a rise in the temperature of the fuel reforming device, the steam containing a necessary and sufficient amount of a fuel gas to prevent oxidation within the fuel reforming device; and supplying the fuel gas, in a necessary amount according to actuation of the fuel cell body, after completion of the rise in the temperature of the fuel reforming device, to start an operation for power generation.

9. The fuel cell power generation apparatus of claim 1, wherein the oxygen adsorbent is disposed in the location between the reforming catalyst layer and the CO conversion catalyst layer in the fuel reforming device, and a heat insulating layer or a heat exchange portion is disposed between the oxygen adsorbent and the CO conversion catalyst layer.

* * * * *